(12) United States Patent
Iwaizumi et al.

(10) Patent No.: US 9,952,760 B2
(45) Date of Patent: Apr. 24, 2018

(54) MOBILE TERMINAL, NON-TRANSITORY COMPUTER READABLE STORAGE MEDIUM, AND COMBINATION CONTROL METHOD

(71) Applicant: KYOCERA CORPORATION, Kyoto (JP)

(72) Inventors: Tomoki Iwaizumi, Osaka (JP); Keisuke Nagata, Hyogo (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/048,894

(22) Filed: Feb. 19, 2016

(65) Prior Publication Data

US 2016/0170635 A1 Jun. 16, 2016

Related U.S. Application Data

(63) Continuation of application No. PCT/JP2014/072554, filed on Aug. 28, 2014.

(30) Foreign Application Priority Data

Aug. 28, 2013 (JP) .................. 2013-177158

(51) Int. Cl.
  *G06F 3/0488* (2013.01)
  *G06F 3/0481* (2013.01)
  *G06F 3/0484* (2013.01)
  *G06T 11/60* (2006.01)

(52) U.S. Cl.
  CPC ...... *G06F 3/04883* (2013.01); *G06F 3/04817* (2013.01); *G06F 3/04842* (2013.01); *G06T 11/60* (2013.01); *G06F 2203/04808* (2013.01)

(58) Field of Classification Search
  CPC ....... G06F 2203/04808; G06F 3/04817; G06F 3/04842; G06F 3/04883; G06T 11/06
  USPC ......................................... 345/698
  See application file for complete search history.

(56) References Cited

U.S. PATENT DOCUMENTS 5,550,969 A * 8/1996 Torres ................ G06F 3/04855
  345/684
5,801,699 A 9/1998 Hocker et al.
2012/0030628 A1* 2/2012 Lee ....................... G06F 3/0486
  715/835

FOREIGN PATENT DOCUMENTS

JP 09-212330 A 8/1997
JP 2012-008916 1/2012

OTHER PUBLICATIONS

International Search Report in International Application No. PCT/JP2014/072554, dated Nov. 11, 2014, in 1 page.

(Continued)

*Primary Examiner* — Tony Davis
(74) *Attorney, Agent, or Firm* — Duane Morris LLP

(57) ABSTRACT

A mobile terminal includes a display device, a touch panel, a selector, and a combination unit. The display device is a device on which a plurality of tiled objects for performing functions are displayed in particular shapes. The touch panel is disposed on the display device. The selector selects, when two positions are touched on the touch panel, one or more of the tiled objects based on the positions of the touch. The combination unit combines, when the selector selects two or more of the tiled objects, the two or more tiled objects together while retaining shapes of the two or more tiled objects.

17 Claims, 21 Drawing Sheets

(56) References Cited

OTHER PUBLICATIONS

Written Opinion of the International Searching Authority in International Application No. PCT/JP2014/072554, dated Nov. 11, 2014, and a statement of relevance of non-English references cited therein, in 11 pages total.

* cited by examiner

F I G. 2
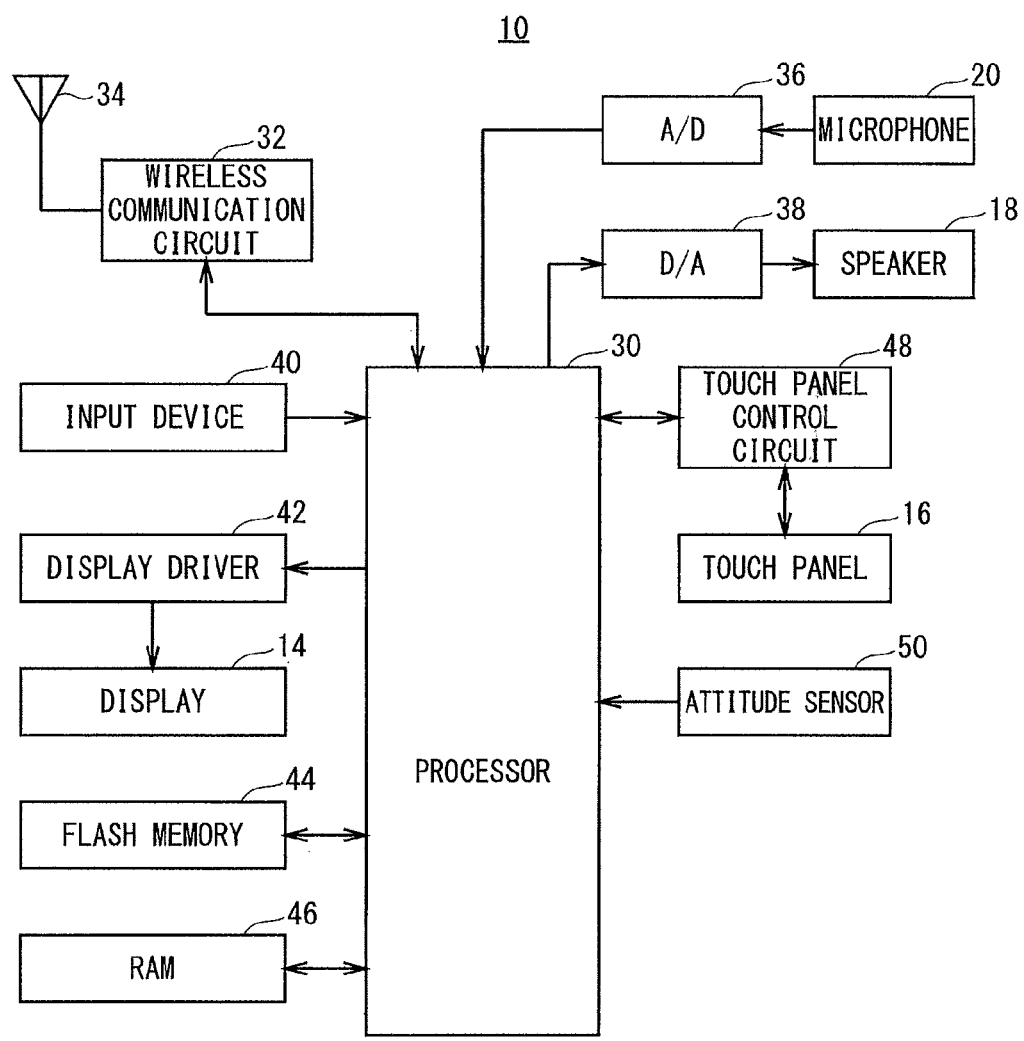

F I G. 3
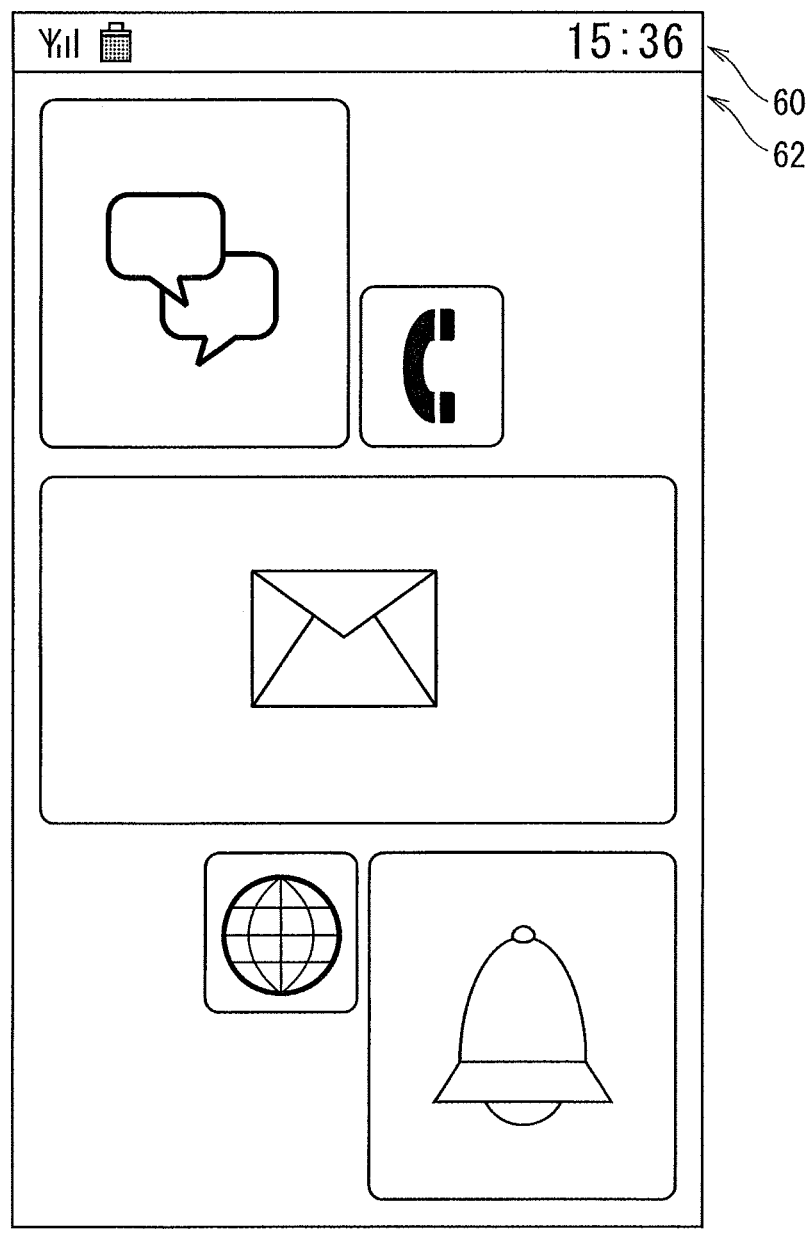

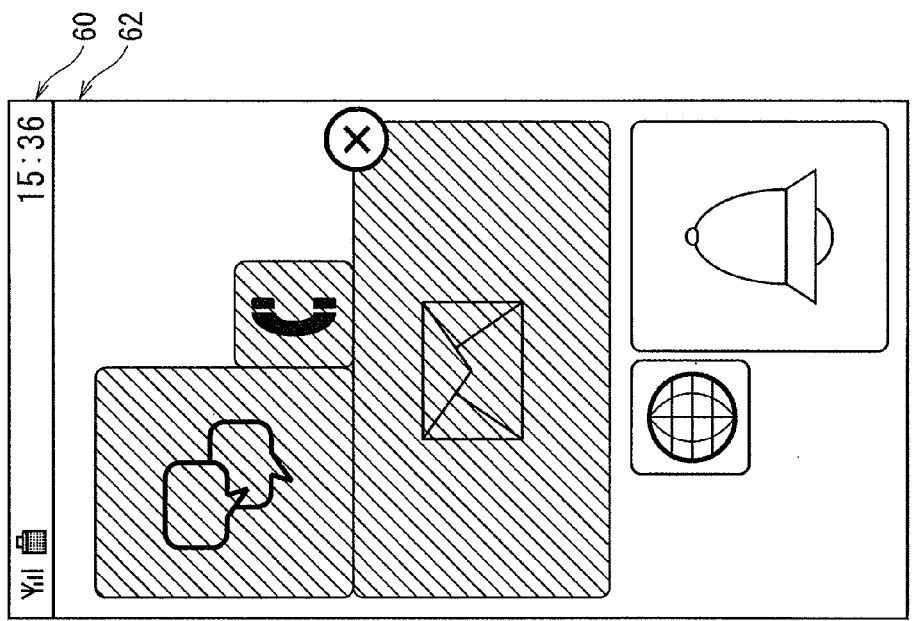
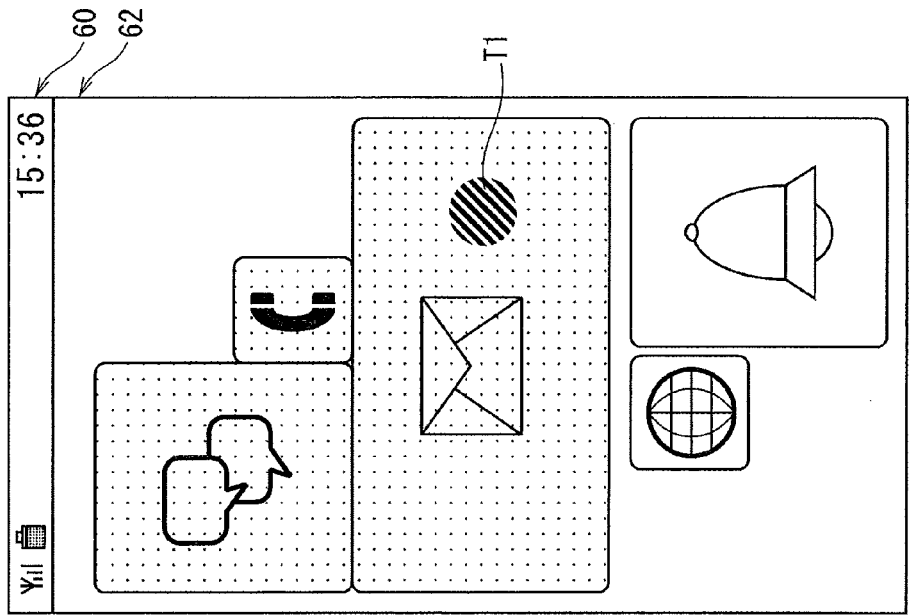

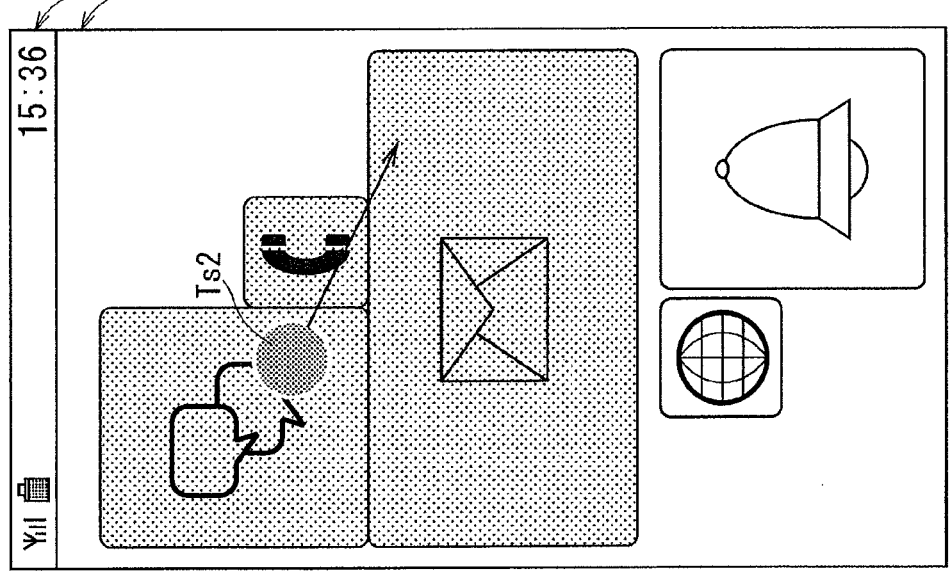
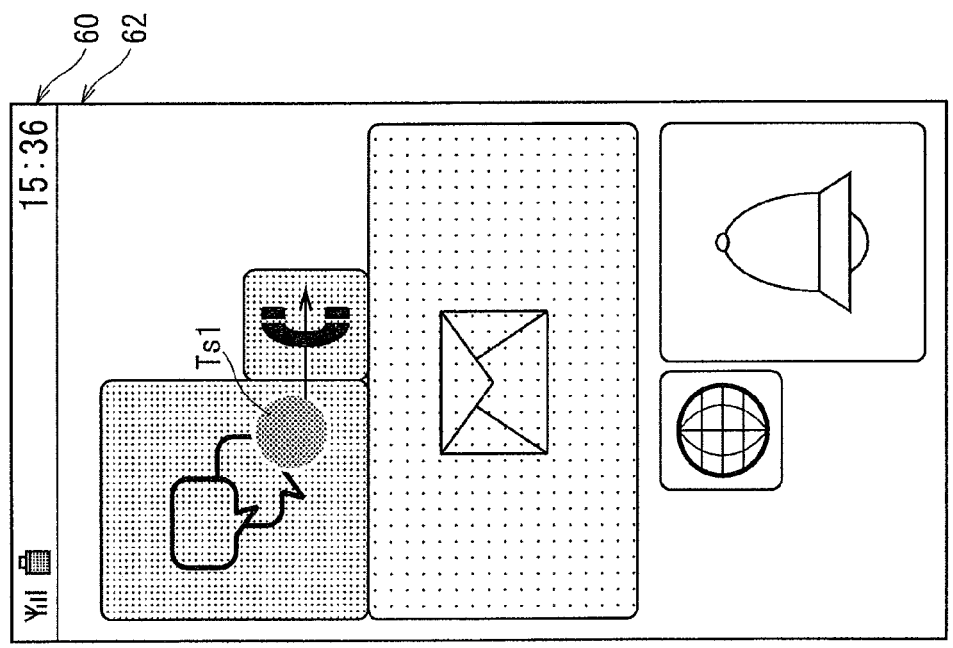

F I G. 1 2
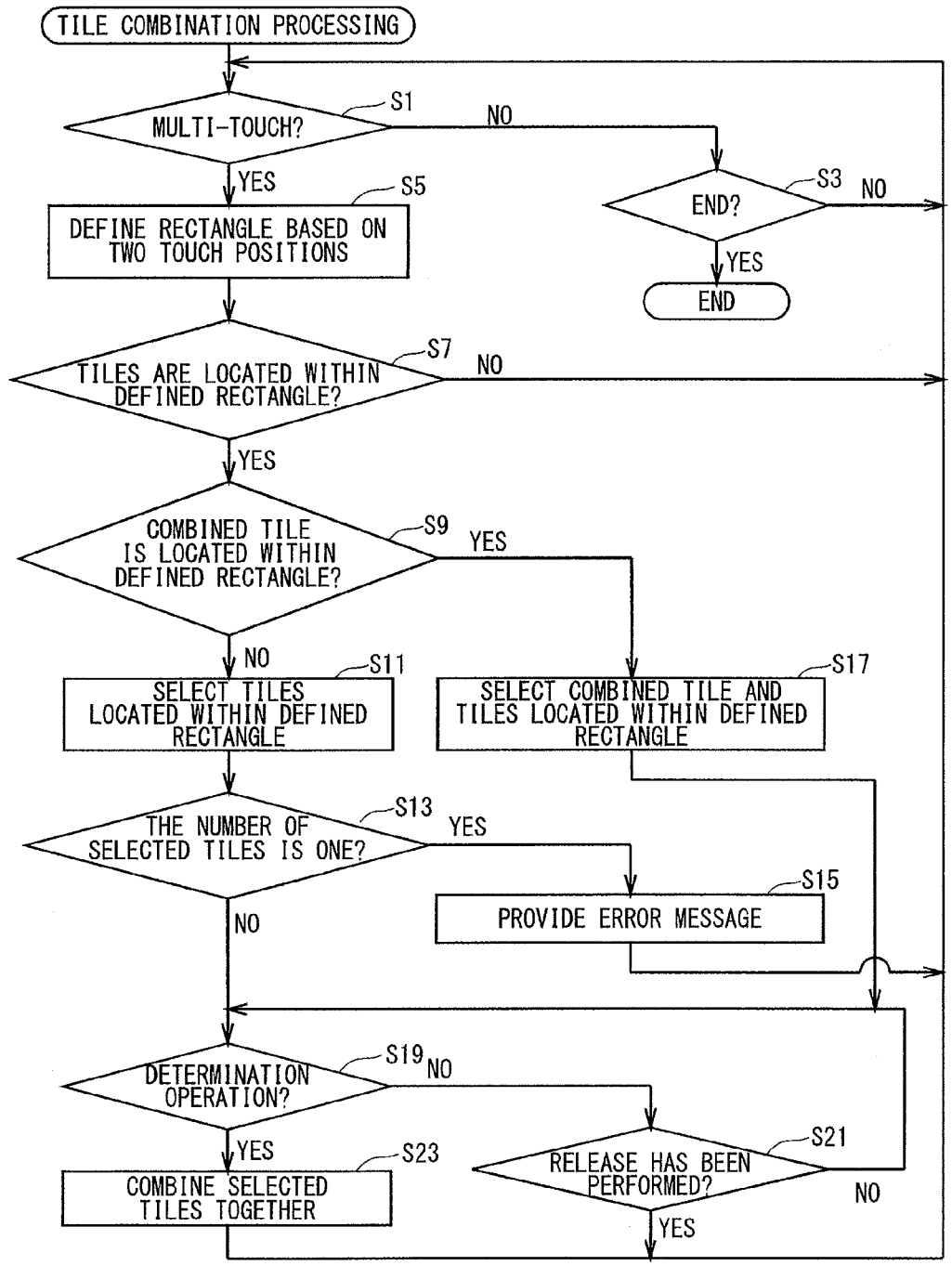

F I G. 1 5
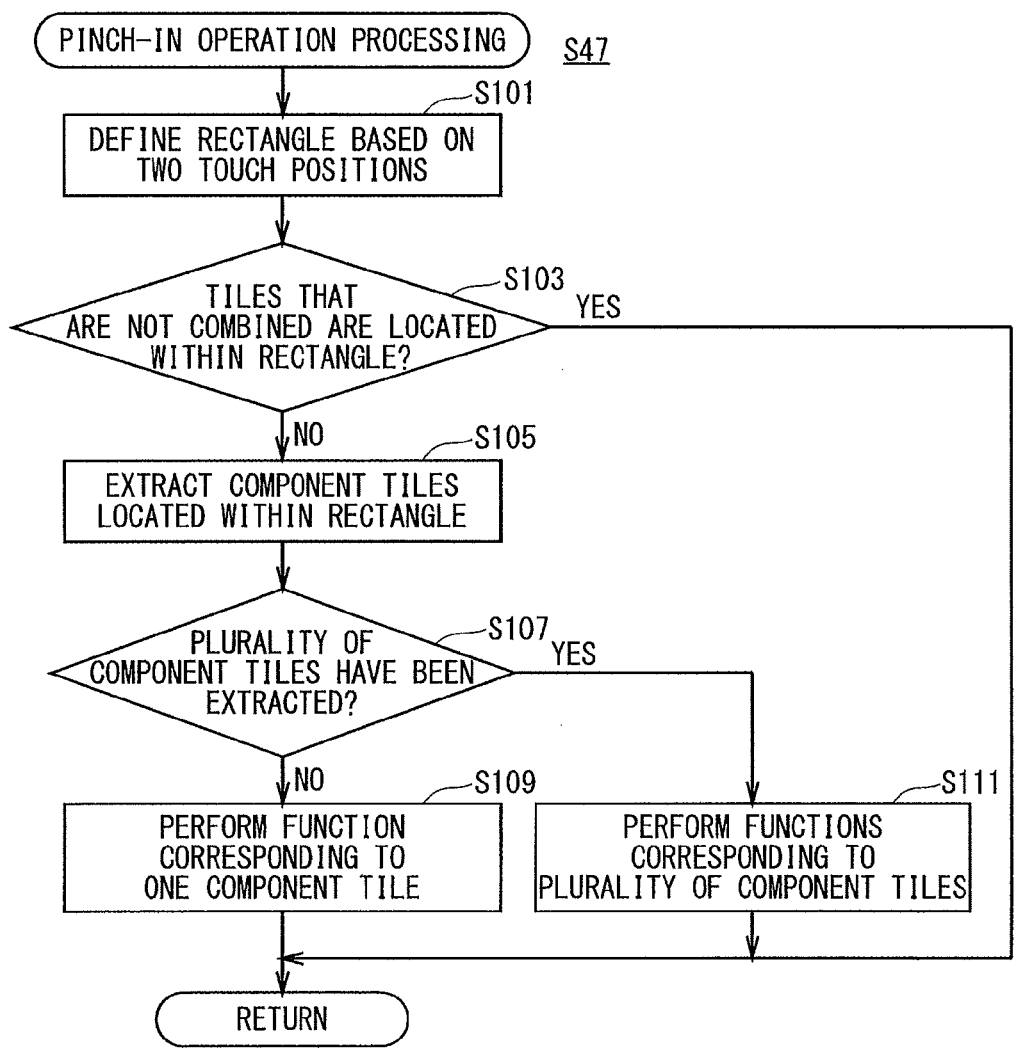

F I G. 1 7
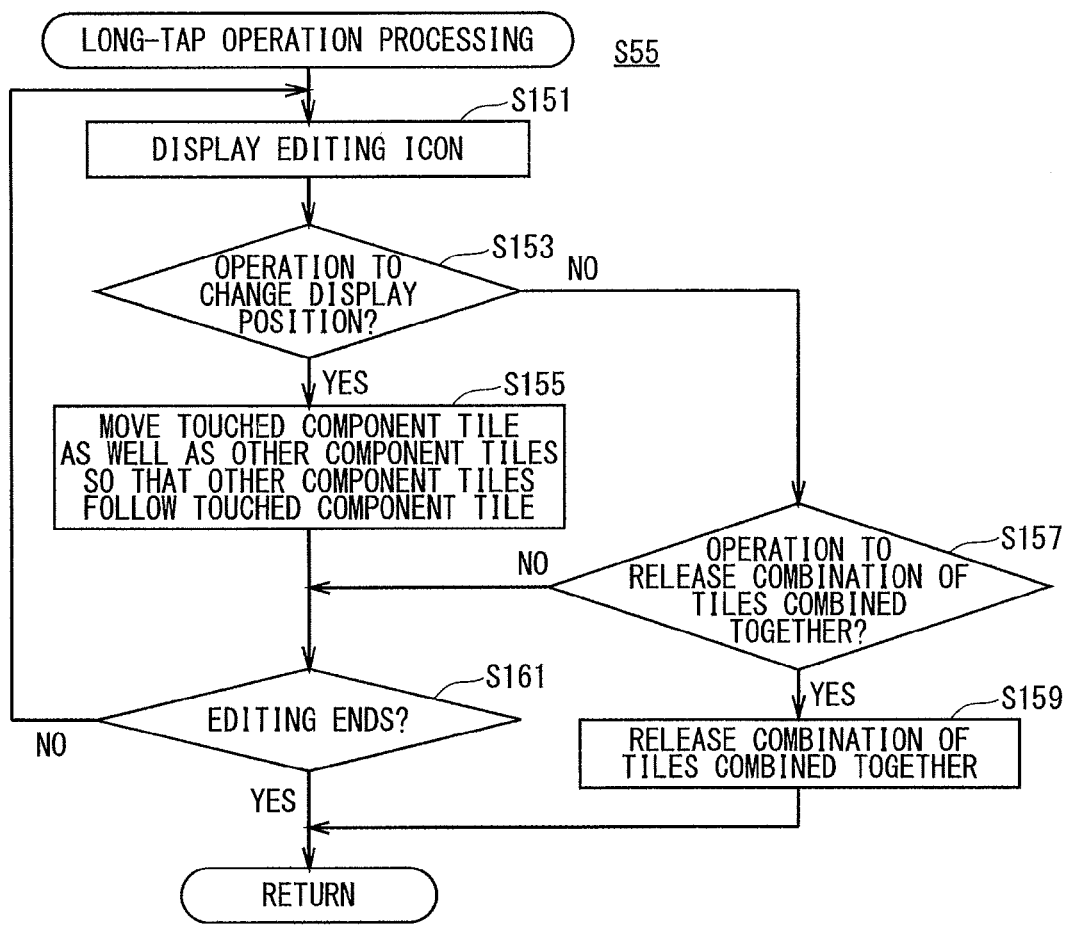

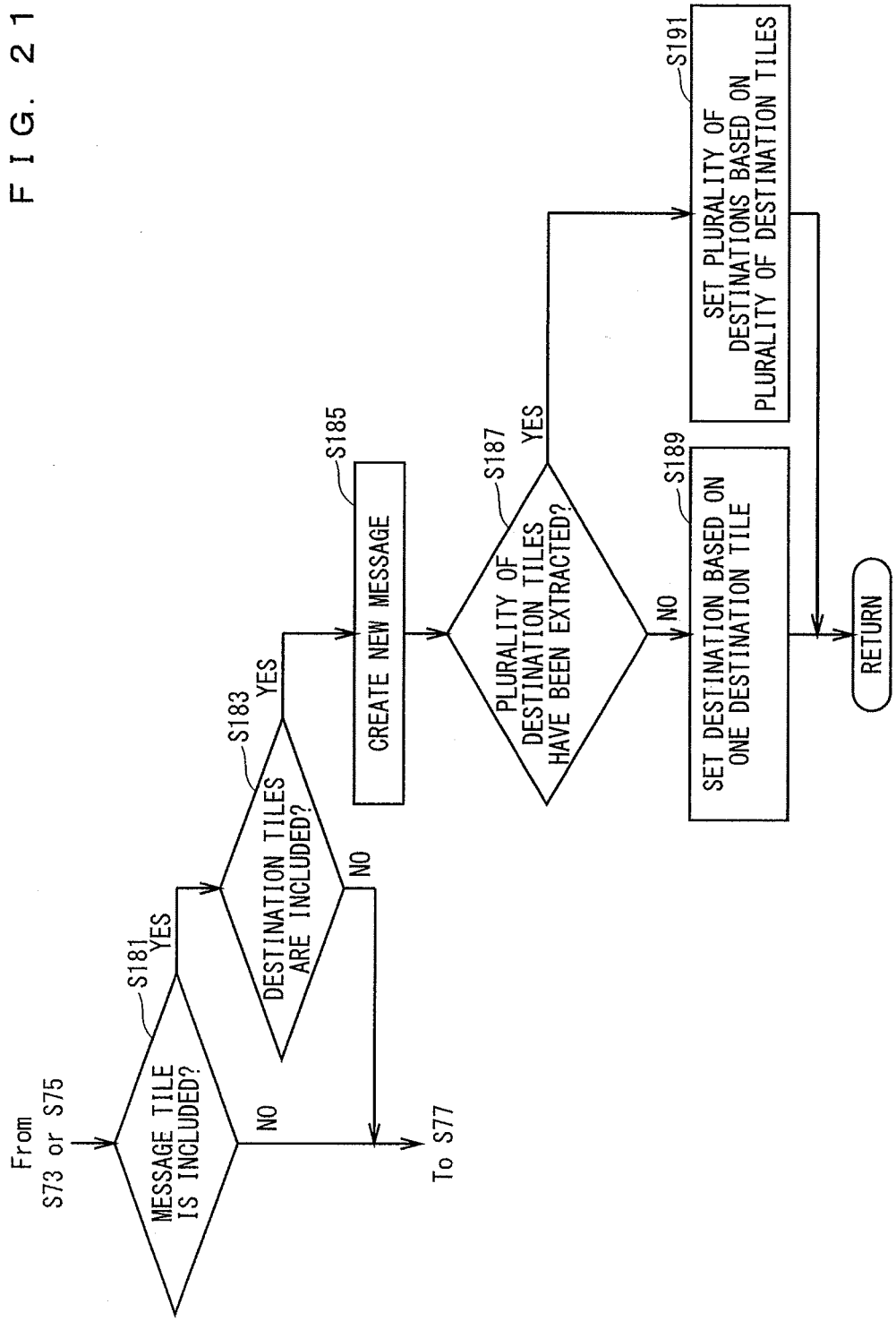

MOBILE TERMINAL, NON-TRANSITORY COMPUTER READABLE STORAGE MEDIUM, AND COMBINATION CONTROL METHOD

CROSS-REFERENCE TO RELATED APPLICATIONS

The present application is a continuation of International Application No. PCT/JP2014/072554, filed on Aug. 28, 2014, which claims the benefit of Japanese Patent Application No. 2013-177158, filed on Aug. 28, 2013. International Application No. PCT/JP2014/072554 is entitled "PORTABLE TERMINAL, COMBINATION CONTROL PROGRAM, AND COMBINATION CONTROL DEVICE", and Japanese Patent Application No. 2013-177158 is entitled "MOBILE TERMINAL, COMBINATION CONTROL PROGRAM, AND COMBINATION CONTROL METHOD". The contents of these applications are incorporated herein by reference in their entirety.

FIELD

Embodiments of the present disclosure relate to a mobile terminal, a non-transitory computer readable storage medium, and a combination control method, and, in particular, to a mobile terminal, a non-transitory computer readable storage medium, and a combination control method for displaying objects.

BACKGROUND

In a conventional electronic apparatus, technology for creating a new folder by dragging and dropping one object so that the object overlaps at least part of one icon, and storing the object and a file associated with the icon in the new folder is disclosed.

SUMMARY

A mobile terminal, a non-transitory computer readable storage medium, and a combination control method are disclosed. In one embodiment, a mobile terminal includes a display device, a touch panel, a selector, and a combination unit. The display device is a device on which a plurality of tiled objects for performing functions are displayed in particular shapes. The touch panel is disposed on the display device. The selector selects, when two positions are touched on the touch panel, one or more of the tiled objects based on the positions of the touch. The combination unit combines, when the selector selects two or more of the tiled objects, the two or more tiled objects together while retaining shapes of the two or more tiled objects.

In one embodiment, a non-transitory computer readable storage medium stores a combination control program that causes a processor of a mobile terminal to function as a selector and a combination unit. The mobile terminal includes a display device on which a plurality of tiled objects for performing functions are displayed in particular shapes and a touch panel disposed on the display device. The selector selects, when two positions are touched on the touch panel, one or more of the tiled objects based on the positions of the touch. The combination unit combines, when the selector selects two or more of the tiled objects, the two or more tiled objects together while retaining shapes of the two or more tiled objects.

In one embodiment, a combination control method is a method for use in a mobile terminal including a display device on which a plurality of tiled objects for performing functions are displayed in particular shapes and a touch panel disposed on the display device. A processor of the mobile terminal performs a selection step and a combination step. The selection step is a step of selecting, when two positions are touched on the touch panel, one or more of the tiled objects based on the positions of the touch. The combination step is a step of combining, when two or more of the tiled objects are selected in the selection step, the two or more tiled objects together while retaining shapes of the two or more tiled objects.

BRIEF DESCRIPTION OF DRAWINGS

FIG. 2 illustrates electrical configuration of the mobile phone illustrated in FIG. 1.

FIG. 3 illustrates an example of the state of displaying a home screen on a display illustrated in FIG. 1.

FIGS. 6A and 6B illustrate an example of an operation to make the combined tile editable.

FIGS. 7A and 7B illustrate examples of a touch operation to select any component tiles from a plurality of component tiles.

FIG. 12 illustrates a flow chart showing an example of tile combination processing performed by a processor.

FIG. 15 illustrates a flow chart showing an example of pinch-in operation processing performed by the processor.

FIG. 17 illustrates a flow chart showing an example of long-tap operation processing performed by the processor.

FIG. 21 illustrates a flow chart showing an example of part of the slide operation processing performed by the processor.

DETAILED DESCRIPTION

First Embodiment

Figure 1:
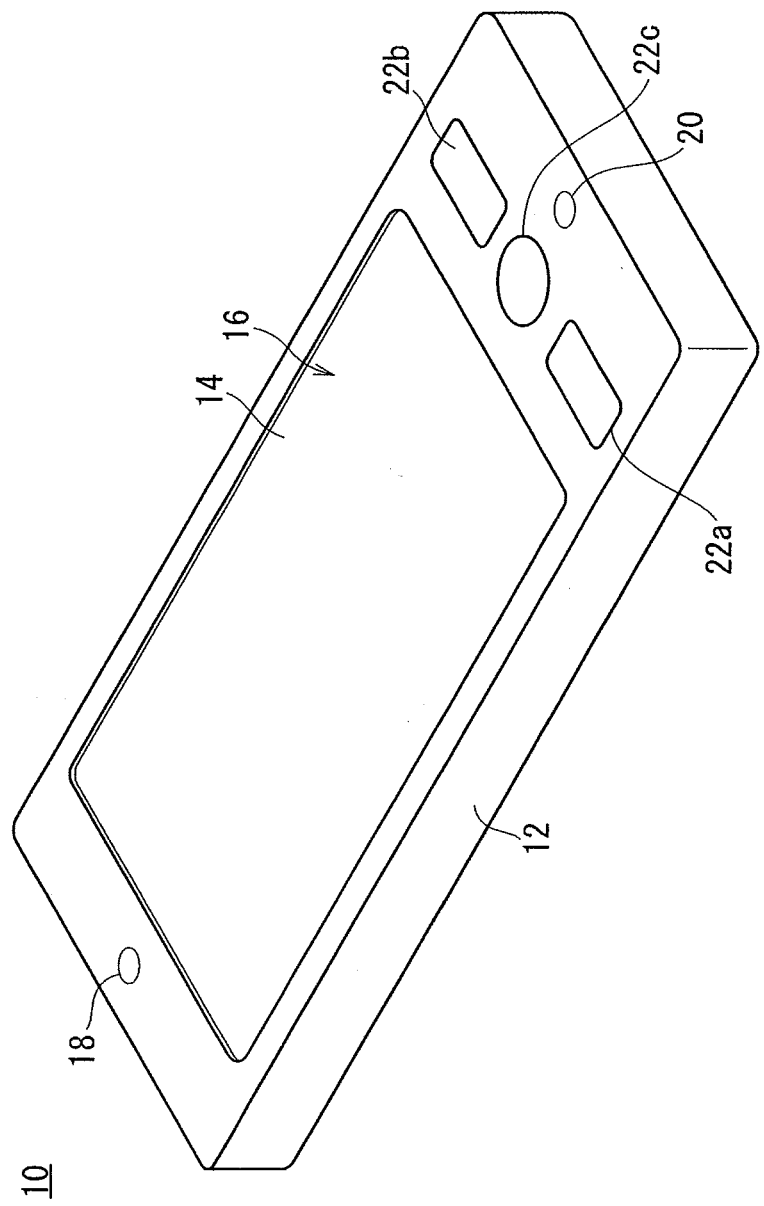
FIG. 1 illustrates the appearance of a mobile phone.

FIG. 1 illustrates the appearance of a mobile phone according to one embodiment. As illustrated in FIG. 1, the mobile phone 10 is a smartphone, and includes a flat longitudinal rectangular housing 12. It is noted in advance that the present disclosure is applicable to any mobile terminals including a tablet terminal, a tablet PC, a note PC, and a personal digital assistant (PDA) each having a touch panel.

A display 14, such as a liquid crystal display and an organic EL display, is disposed at one main surface (a front surface) of the housing 12. The display 14 is also referred to as a display device. A touch panel 16 is disposed on the display 14.

A speaker 18 is embedded in the housing 12 at one end of the main surface in a longitudinal direction of the housing 12, and a microphone 20 is embedded in the housing 12 at the other end of the main surface in the longitudinal direction.

As hard keys constituting an input operation means along with the touch panel 16, a call key 22a, an end key 22b, and a menu key 22c are disposed at the one main surface of the housing 12 in one embodiment.

For example, a user can input phone numbers by performing a touch operation through the touch panel 16 on a dialpad displayed on the display 14, and can start voice calls by operating the call key 22a. The user can end voice calls by operating the end key 22b. The user can power on and off the mobile phone 10 by long-pressing the end key 22b.

When the menu key 22c is operated, a home screen is displayed on the display 14. By performing a touch operation through the touch panel 16 on an object and the like displayed on the display 14 in this state, the user can select the object, and determine the selection.

The mobile phone 10 can perform not only a phone function but also an address book function, an email function, a browser function, and the like. In the following description, a graphical user interface (GUI) such as a key, an icon, and the like displayed on the display 14 are also collectively referred to as objects.

FIG. 2 illustrates electrical configuration of the mobile phone 10, and the mobile phone 10 includes a processor 30 referred to as a computer or a CPU. A wireless communication circuit 32, an A/D converter 36, a D/A converter 38, an input device 40, a display driver 42, flash memory 44, RAM 46, a touch panel control circuit 48, an attitude sensor 50, and the like are connected to the processor 30.

The processor 30 controls the mobile phone 10 as a whole. All or some programs preset in the flash memory 44 are developed on the RAM 46 in use, and the processor 30 operates in accordance with the programs on the RAM 46. The RAM 46 is also used as a working area or a buffer area of the processor 30.

The input device 40 includes the hard keys 22 illustrated in FIG. 1. The input device 40 thus forms an operation receiver that receives key operations on the hard keys 22 from the user. Information (key data) on the hard keys operated by the user is input into the processor 30.

The wireless communication circuit 32 is a circuit for transmitting and receiving radio waves for voice calls and emails through an antenna 34. In one embodiment, the wireless communication circuit 32 is a circuit for performing wireless communication in accordance with a CDMA system. For example, if the user provides directions to make a call (transmit voice) by operating the touch panel 16, the wireless communication circuit 32 performs voice transmission processing and outputs a voice transmission signal through the antenna 34 under the directions of the processor 30. The voice transmission signal is transmitted to a phone of a recipient through a base station and a communication network. When voice reception processing is performed in the phone of the recipient, a communicable state is established, and the processor 30 performs call processing.

The microphone 20 illustrated in FIG. 1 is connected to the A/D converter 36. As described above, the A/D converter 36 converts voice signals from the microphone 20 into digital voice data, and inputs the digital voice data into the processor 30. On the other hand, the speaker 18 is connected to the D/A converter 38. The D/A converter 38 coverts digital voice data into voice signals, and provides the voice signals to the speaker 18 through an amplifier. Voice based on the voice data is thus output from the speaker 18. When the call processing is being performed, voice collected by the microphone 20 is transmitted to the phone of the recipient, and voice collected by the phone of the recipient is output from the speaker 18.

The processor 30 can adjust the volume of the voice output from the speaker 18 by controlling an amplification factor of the amplifier connected to the D/A converter 38 in response to a volume adjustment operation performed by the user, for example.

The display 14 illustrated in FIG. 1 is connected to the display driver 42, and videos or images are displayed on the display 14 in accordance with video data or image data output from the processor 30. The display driver 42 includes video memory for temporarily storing therein image data to be displayed, and data output from the processor 30 is stored in the video memory. The display driver 42 displays images on the display 14 in accordance with the contents of the video memory. This means that the display driver 42 controls display on the display 14 connected to the display driver 42 under the directions of the processor 30. The processor 30 is thus also referred to as a display controller. A backlight is disposed on the display 14, and the display driver 42 controls brightness and turning-on and -off of the backlight in accordance with the directions of the processor 30.

The touch panel 16 illustrated in FIG. 1 is connected to the touch panel control circuit 48. The touch panel control circuit 48 provides necessary voltage and the like to the touch panel 16, and inputs, into the processor 30, a touch start signal indicating the start of a touch of the user on the touch panel 16, an end signal indicating the end of the touch of the user, and coordinate data indicating a touch position of the touch of the user. The processor 30 can thus determine an object touched by the user based on the coordinate data.

In one embodiment, the touch panel 16 is a capacitive touch panel that detects a change in capacitance caused between the surface of the touch panel 16 and an object such as a finger. The touch panel 16 detects a touch of one or more fingers on the touch panel 16, for example. The touch panel 16 is thus also referred to as a pointing device. The touch panel control circuit 48 detects a touch operation in a touch detectable range of the touch panel 16, and outputs coordinate data indicating the position of the touch operation to the processor 30. This means that the user performs a touch operation on the surface of the touch panel 16 to input the position, the direction, and the like of the operation into the mobile phone 10.

In one embodiment, the touch operation includes a tap operation, a long-tap operation, a flick operation, a slide operation, and the like.

The tap operation refers to an operation to touch the surface of the touch panel 16 with a finger and then release the finger from the surface of the touch panel 16 in a short time. The long-tap operation refers to an operation to touch the surface of the touch panel 16 with a finger for a predetermined time or more and then release the finger from the surface of the touch panel 16. The flick operation refers to an operation to touch the surface of the touch panel 16 with a finger and flick the surface of the touch panel 16 with the finger in any direction at a predetermined speed or more. The slide operation refers to an operation to move a finger on the surface of the touch panel 16 in any direction with the finger being in contact with the surface of the touch panel 16 and then release the finger from the surface of the touch panel 16.

The above-mentioned slide operation includes a slide operation to touch an object displayed on the surface of the display 14 with a finger and move the object, which is a so-called drag operation. An operation to release the finger from the surface of the touch panel 16 after the drag operation is referred to as a drop operation.

In the following description, the tap operation, the long-tap operation, the flick operation, the slide operation, the drag operation, and the drop operation may each be described by omitting a term "operation". The touch operation may be performed not only with a finger of the user but also with a stylus pen or the like.

The attitude sensor 50 is used to detect movement of the mobile phone 10. The attitude sensor 50 is a piezoelectric gyro, for example, and detects angular velocities of three axes (x-, y-, and z-axes), and outputs results of detection to the processor 30. The processor 30 detects movement and a tilt of the mobile phone 10 based on the angular velocities of the respective axes detected by the attitude sensor 50. The processor 30 controls a display direction of the display 14 and the like based on the detected movement. As the attitude sensor 50, an acceleration sensor may be used in place of the gyro sensor.

FIG. 3 illustrates an example of the home screen displayed on the display 14. A display range of the display 14 includes a state display area 60 and a function display area 62. In the state display area 60, a pictogram indicating a radio wave reception state of the antenna 34, a pictogram indicating the amount of power remaining in a secondary battery, and time are displayed. In the function display area 62, a plurality of tiled objects (hereinafter, simply referred to as tiles) are displayed in the form of rectangles having different sizes.

The tiles are shortcuts for performing functions and developing data. Tiles for performing functions are particularly referred to as functional tiles. Shapes of the tiles include a small size, a medium size, and a large size, and the tiles are each set to have any of the sizes (shapes).

By tapping the functional tiles, for example, the user can perform the functions corresponding to the tiles. In a case where the functions corresponding to the functional tiles are performed in the background, states of the functions are shown as live information on the functional tiles. The user can further add a tile corresponding to any function or data to the home screen. The "functions" in one embodiment include an application installed in the mobile phone 10 as well as a setting function to change settings of the mobile phone 10.

In the home screen of FIG. 3, a social networking service (an SNS) tile (represented by a picture of speech balloons) corresponding to an application of an SNS such as Twitter® and Facebook®, a phone tile (represented by a picture of a receiver) corresponding to the phone function, an email tile (represented by a picture of an envelope) corresponding to the email function, a browser tile (represented by a picture of Earth) corresponding to the browser function, and an alarm tile (represented by a picture of a bell) corresponding to an alarm function are displayed. The phone tile and the browser tile are each set to have the small size, the SNS tile and the alarm tile are each set to have the medium size, and the email tile is set to have the large size.

The home screen can be scrolled vertically, and the user can display other tiles by scrolling the home screen.

When a tile is long-tapped, a display state of the tile becomes editable. In this state, a display size and a display position of the tile can be changed, and the tile can be deleted. Even if a functional tile is deleted, a corresponding application is not uninstalled.

In a case where many tiles are added to the home screen, it may take the user a long time to find a target tile to perform a function. The user may thus collect a plurality of frequently-used tiles at one position. In a case where the positions of the plurality of tiles collected at one position are changed, however, the user may have to move the tiles one by one, which is bothersome. In one embodiment, two or more tiles are combined together while shapes thereof are retained to increase convenience of the user.

Figure 4A:
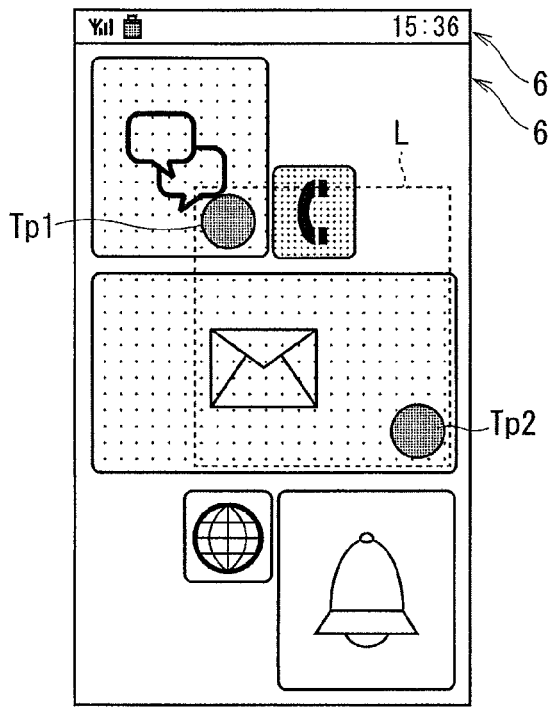
FIGS. 4A, 4B, and 4C illustrate an example of the procedure for combining tiles in the home screen.
Figure 4B:
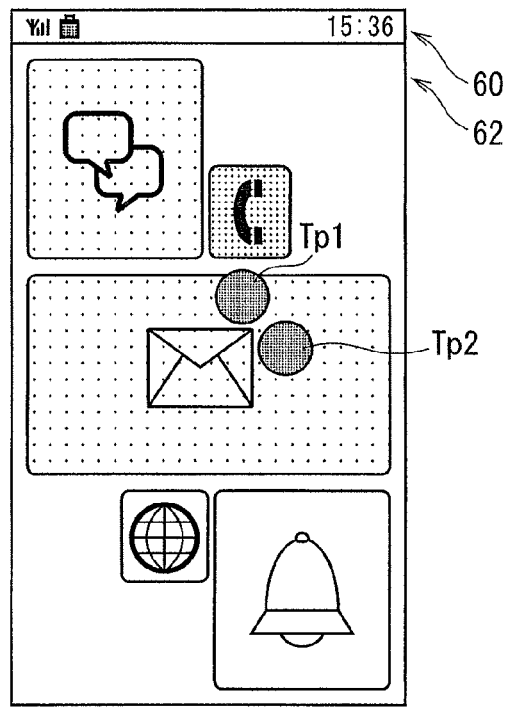
Figure 4C:
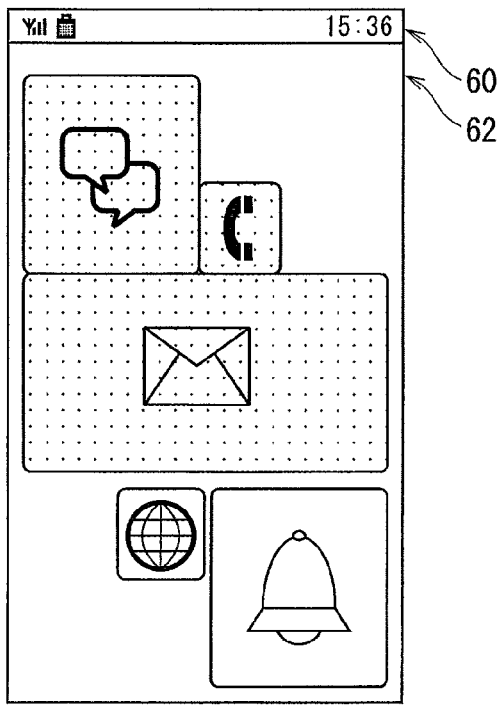

FIGS. 4A, 4B, and 4C illustrate an example of the procedure for combining tiles in the home screen illustrated in FIG. 3. FIG. 4A illustrates an example of an operation to select tiles, FIG. 4B illustrates an example of the state of moving touch positions illustrated in FIG. 4A, and FIG. 4C illustrates an example of the state of combining the tiles.

As illustrated in FIG. 4A, when a touch operation (multi-touch operation) is performed at two positions substantially simultaneously, a rectangle is defined based on the two positions of the touch, one of which on the SNS tile is herein referred to as a first touch position Tp1 and the other one of which on the email tile is herein referred to as a second touch position Tp2. The defined rectangle is indicated by a selection line L, and three tiles, i.e., the SNS tile, the phone tile, and the email tile, located within the selection line L are selected.

When the user moves each of the first touch position Tp1 and the second touch position Tp2 by a predetermined distance or more so that the first touch position Tp1 and the second touch position Tp2 are moved towards each other as illustrated in FIG. 4B, the SNS tile, the phone tile, and the email tile are combined together while shapes thereof are retained as illustrated in FIG. 4C. This means that two or more tiles can be treated as a single tile in one embodiment. This allows the user to easily know a plurality of tiles. The user can determine selection of tiles through an intuitive operation.

In one embodiment, a color of tiles is changed upon selection of the tiles, and remains changed even after the tiles are combined together. Two or more tiles combined together are each referred to as a "component tile (component object)", and are collectively referred to as a "combined tile". In the following description, an operation to move two touch positions towards each other after the multi-touch operation is referred to as a "pinch-in operation".

In other embodiments, tiles may be combined together when the multi-touch operation is performed. Although a tile is selected when at least part of the tile is located within the defined rectangle in one embodiment, a tile may not be selected unless the tile as a whole is located within the defined rectangle in other embodiments.

Figure 5A:
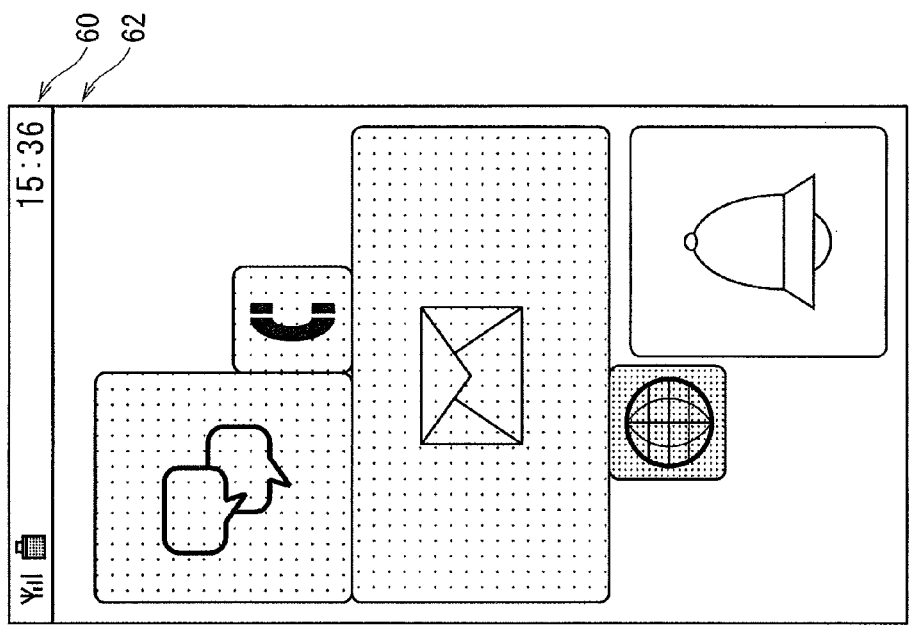
FIGS. 5A and 5B illustrate an example of the procedure for combining a new tile with a combined tile.
Figure 5B:
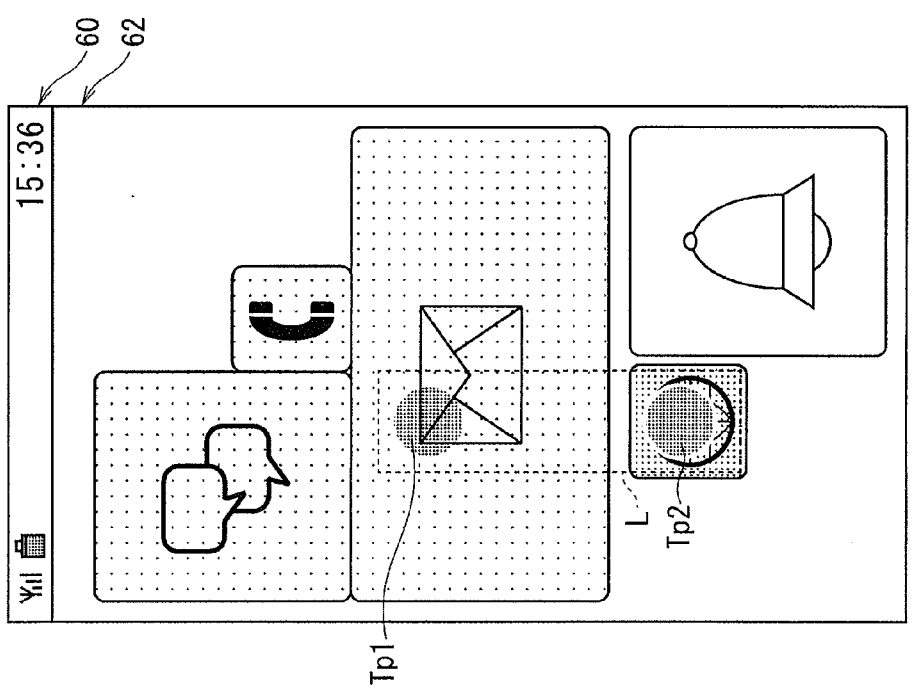

FIGS. 5A and 5B illustrate an example of the procedure for combining a new tile with the combined tile illustrated in FIG. 4C. FIG. 5A illustrates an example of an operation to select the combined tile and a functional tile, and FIG. 5B illustrates an example of the state of combining the combined tile and the functional tile together.

An operation to combine a new tile with a combined tile is described with reference to FIGS. 5A and 5B. For example, when the pinch-in operation is performed so that the browser tile that is not combined and the combined tile are selected as illustrated in FIG. 5A, the combined tile and the selected browser tile are combined together as illustrated in FIG. 5B. This means that the user can optionally adjust the number of tiles combined together as a tile can newly be combined with the combined tile.

Although the number of tiles newly combined with the combined tile is one in one embodiment described above, two or more tiles may newly be combined through the pinch-in operation. Although not illustrated, when the pinch-in operation is performed on two combined tiles, the two combined tiles are combined together to form a single combined tile.

FIGS. 6A and 6B illustrate an example of an operation to make the combined tile illustrated in FIG. 4C editable. FIG. 6A illustrates an example of the touch operation performed on the combined tile, and FIG. 6B illustrates an example of the combined tile in an editable state.

An operation to edit the combined tile is described with reference to FIGS. 6A and 6B. As illustrated in FIG. 6A, when a long-tap operation Tl is performed on any one of component tiles constituting the combined tile, the combined tile becomes editable. A release icon (represented by a cross) is provided as an editing icon to the combined tile in the editable state as illustrated in FIG. 6B.

When the slide operation is performed on any of the component tiles of the combined tile in the editable state, a display position of the combined tile is changed following the slide operation. This means that component tiles on which the touch operation has not been performed are processed so as to move in a similar manner to the component tile on which the touch operation has been performed. The change in display position of the combined tile is determined by pressing the menu key 22c. This means that the user can terminate the editable state of a folder by pressing the menu key 22c. By combining tiles as described above, a plurality of tiles can collectively be moved, and thus the user can easily organize the tiles in the home screen.

When the user performs the tap operation on the release icon, combination of tiles combined together is released. For example, when the tap operation is performed on the release icon illustrated in FIG. 6B, combination of tiles combined together is released, and the tiles return to a state illustrated in FIG. 3. This means that the user can optionally release combination of the tiles combined together when combination of the tiles is no longer necessary.

In other embodiments, combination of tiles may be released when the multi-touch operation is performed on the combined tile not in the editable state, and then a touch operation (pinch-out operation) to move two touch positions away from each other is performed. When combination is released, the color of the tiles returns to an original state.

Although not illustrated, when the number of tiles selected through the pinch-in operation is one, an error notification is provided to the user as the tile cannot be combined. This means that, when the user fails to perform an operation to combine tiles together, the user can know the situation properly.

In other embodiments, when the flick operation is performed on any of the component tiles not in the editable state, combination of only the component tile may be released. This means that the user can optionally release combination of an unnecessary tile.

In other embodiments, when the combined tile is in the editable state, the tiles combined together may optionally be recombined while shapes of the component tiles are retailed.

An operation to perform functions using component tiles is described next. FIGS. 7A and 7B illustrate examples of a touch operation to select any component tiles from the plurality of component tiles illustrated in FIG. 4C. FIG. 7A illustrates an example of the touch operation to select the component tiles, and FIG. 7B illustrates another example of the touch operation to select the component tiles.

When a slide operation whose start point is on a component tile is performed, one or more component tiles located on a path of the slide operation to an end point are selected (extracted), and functions corresponding to the extracted component tiles (functional tiles) are performed. In this case, when a plurality of component tiles are located on the path of the slide operation, functions corresponding to the plurality of component tiles are performed substantially simultaneously. For example, as illustrated in FIG. 7A, when the SNS tile and the phone tile are located on the path of a slide operation Ts1, an SNS function and the phone function are performed substantially simultaneously. As illustrated in FIG. 7B, when the SNS tile, the phone tile, and the email tile are located on the path of a slide operation Ts2, three functions are performed substantially simultaneously. As described above, the user can select any component tiles from a plurality of component tiles through the slide operation to perform functions in one embodiment.

The path of the slide operation is not limited to a straight line, and may be a curved line or a combination of a straight line and a curved line. Even if a functional tile that is not combined is located on the path of the slide operation, a function corresponding to the functional tile is not performed.

Figure 8:
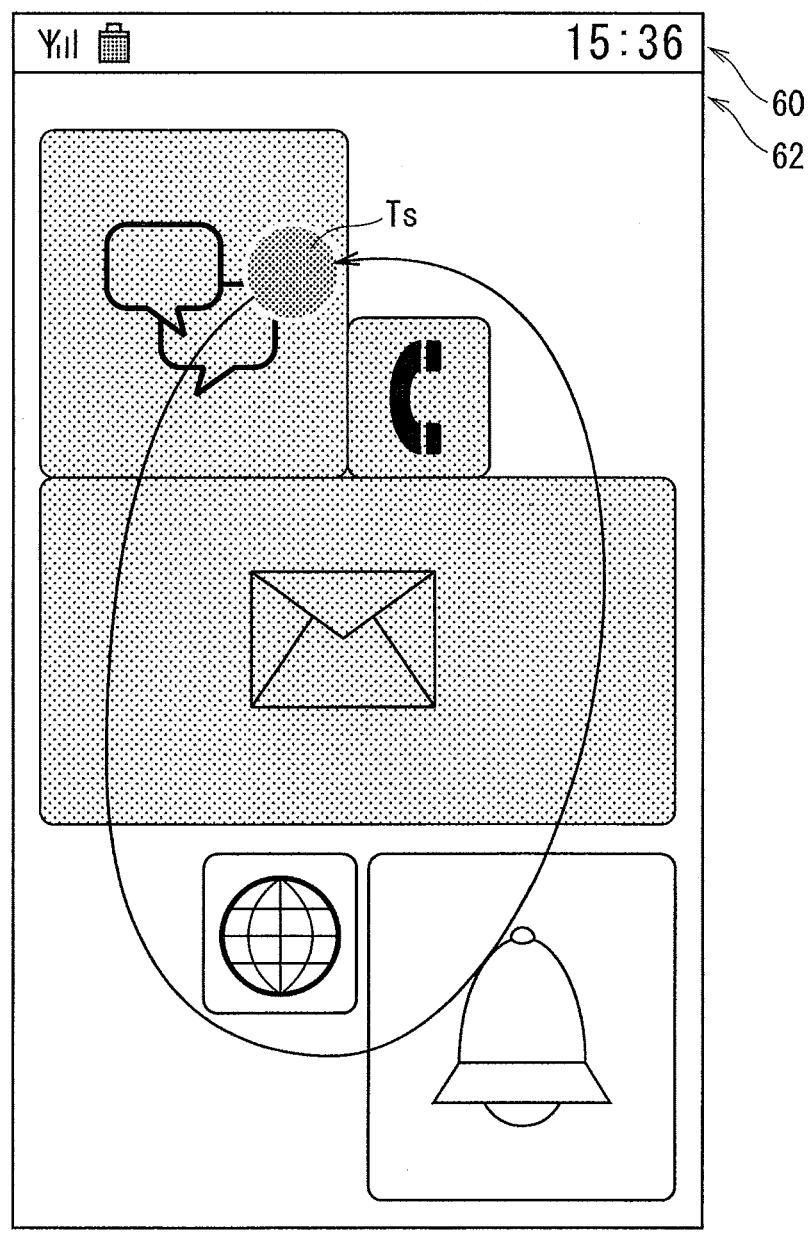
FIG. 8 illustrates another example of the touch operation to select any component tiles from the plurality of component tiles.

FIG. 8 illustrates another example of the touch operation to select any component tiles from the plurality of component tiles illustrated in FIG. 4C. When the slide operation whose start point is on the component tile is performed, and an area is defined by the path of the slide operation, one or more component tiles located within the defined area are extracted (selected), and functions corresponding to the extracted component tiles are performed. For example, as illustrated in FIG. 8, when the area is defined through a slide operation whose start point and end point approximately match each other, the SNS function, the phone function, and the email function respectively corresponding to the SNS tile, the phone tile, and the email tile located within the area are performed substantially simultaneously. As described above, the user can perform any functions by performing a simple operation to define the area through the slide operation.

Although the path of the slide operation is not located on the phone tile, the phone function is performed as the phone tile is located within the defined area. On the other hand, although the browser tile as a whole and part of the alarm tile are located within the defined area, the browser function and the alarm function are not performed as the browser tile and the alarm tile are not component tiles.

The start point and the end point of the slide operation are determined to match each other when they are separated from each other by a predetermined distance (e.g., 3 mm) or less or by a predetermined number of dots (e.g., 12 dots) or less. Although not illustrated, an operation is determined to be the slide operation to define the area when the path of the slide operation forms a cross. In this case, the path of the slide operation is determined to form a cross when the start point or the end point of the slide operation is separated from the path of the slide operation by the predetermined distance or less or by the predetermined number of dots or less.

Figure 9:
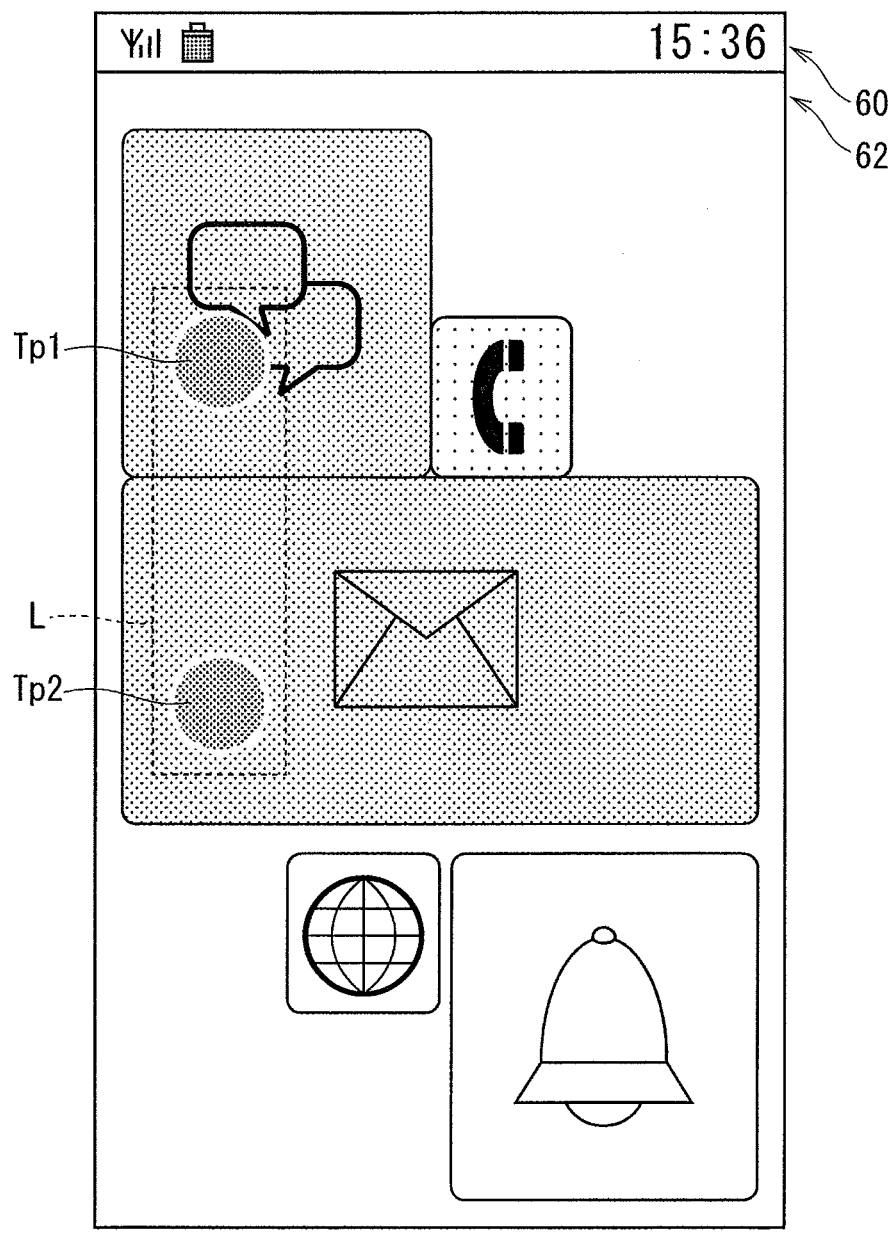
FIG. 9 illustrates another example of the touch operation to select any component tiles from the plurality of component tiles.

FIG. 9 illustrates another example of the touch operation to select any component tiles from the plurality of component tiles illustrated in FIG. 4C. When the pinch-in operation is performed on the component tiles, one or more component tiles located within a rectangle defined through the pinch-in operation are extracted. Functions corresponding to the extracted component tiles are performed as in the other operations. For example, as illustrated in FIG. 9, when the pinch-in operation is performed at the first touch position Tp1 on the SNS tile and the second touch position Tp2 on the email tile, and the SNS tile and the email tile are located within the rectangle defined by the pinch-in operation, the SNS tile and the email tile are extracted. When the pinch-in operation ends, the SNS function and the email function are performed substantially simultaneously. As described above, the user can perform functions corresponding to component tiles by selecting the component tiles through the pinch-in operation.

Figure 10:
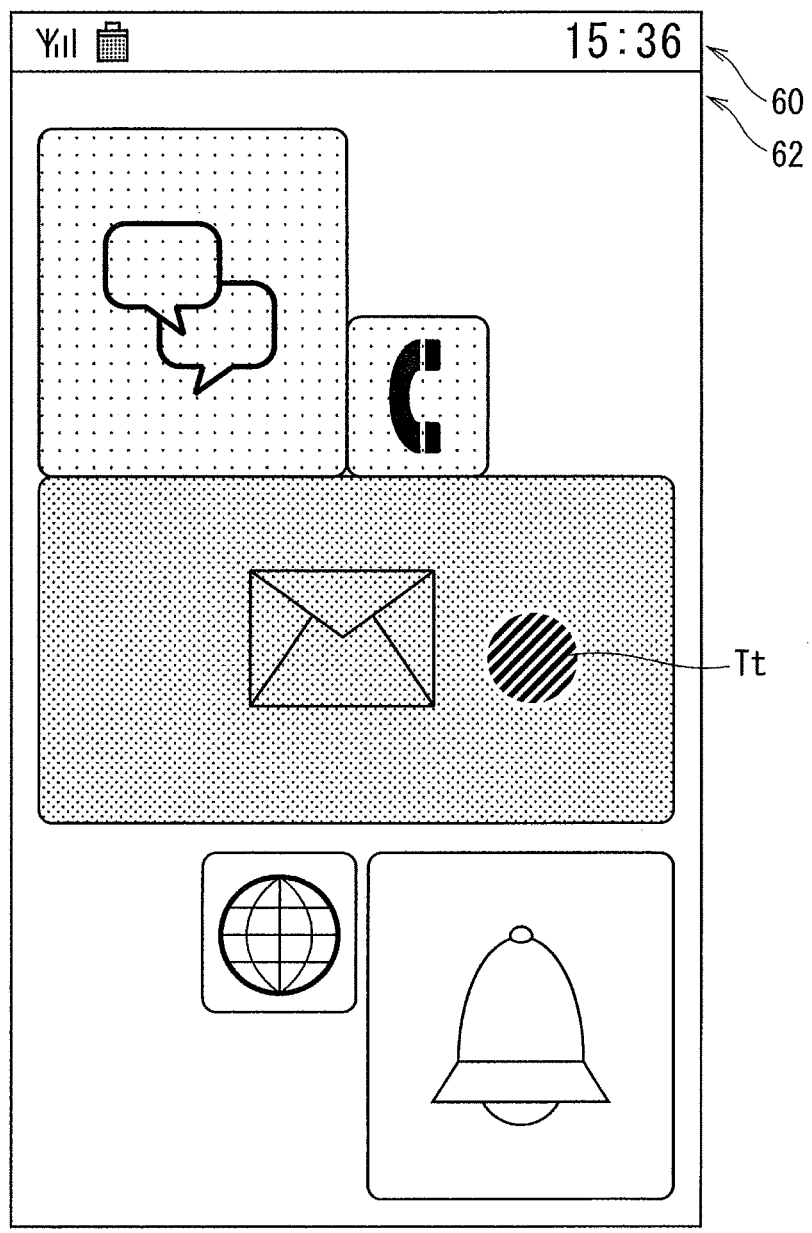
FIG. 10 illustrates yet another example of the touch operation to select any component tile from the plurality of component tiles.

FIG. 10 illustrates yet another example of the touch operation to select any component tile from the plurality of component tiles illustrated in FIG. 4C. When the tap operation is performed on any component tile, a function corresponding to the component tile on which the tap operation has been performed is performed. For example, when a tap operation Tt is performed on the email tile, the email function is performed. This means that the user can perform any function by performing the tap operation on a component tile corresponding to the any function.

As can be understood from the foregoing description, the user can perform any function by selecting any component tile through the touch operation. In particular, the user can perform a plurality of functions substantially simultaneously by selecting a plurality of component tiles. This increases convenience of the user of the mobile phone 10.

Although the functions are performed when the slide operation, the pinch-out operation, and the tap operation end in one embodiment, the functions may be performed when a determination operation, such as an operation to press the menu key 22c, is performed after the touch operation ends in other embodiments.

Features of one embodiment have been briefly described above. One embodiment is described in detail below with use of a memory map illustrated in FIG. 11 and flow charts illustrated in FIGS. 12 to 17.

Figure 11:
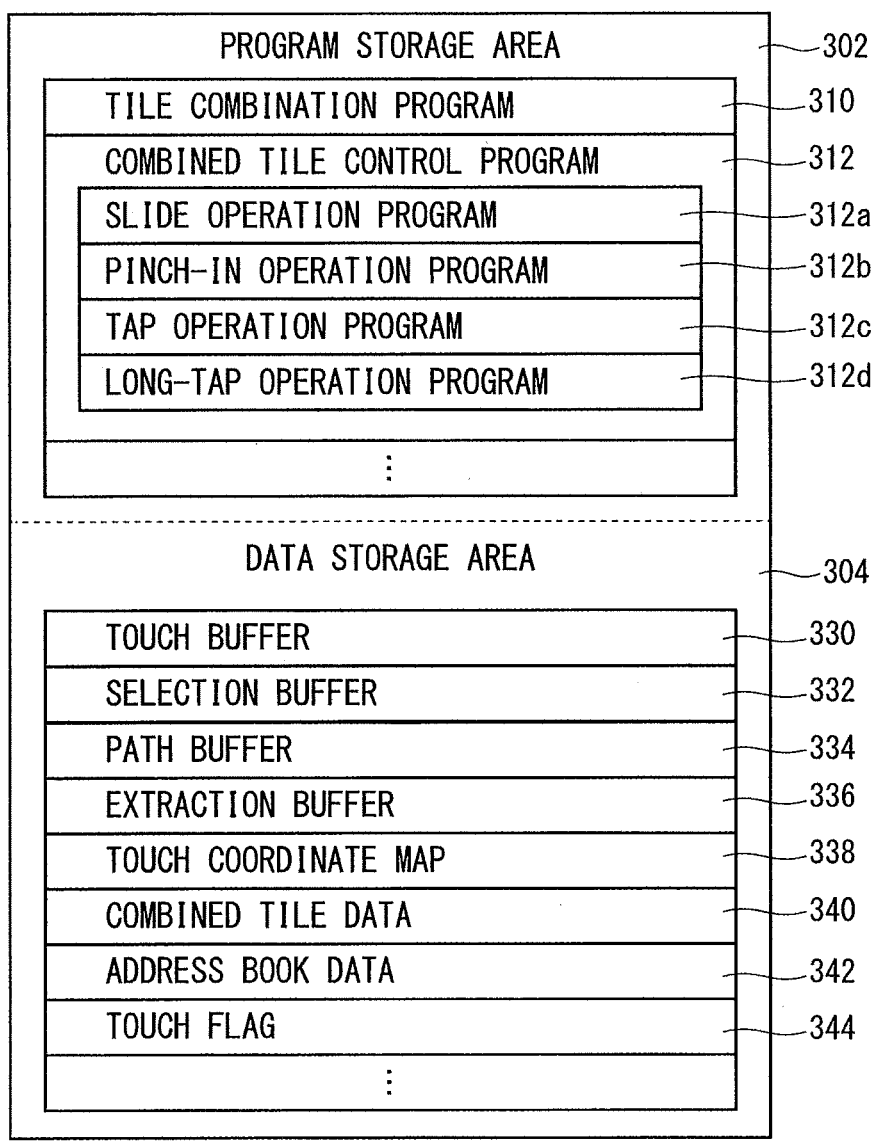
FIG. 11 illustrates an example of a memory map of RAM.

FIG. 11 illustrates an example of the memory map of the RAM illustrated in FIG. 2. As illustrated in FIG. 11, a program storage area 302 and a data storage area 304 are formed in the RAM 46. The program storage area 302 is an area for reading and storing (developing) part or all of program data preset in the flash memory 44 (FIG. 2) as described above.

In the program storage area 302, a tile combination program 310 for combining selected tiles together, a combined tile control program 312 for performing processing in accordance with the touch operation performed on the combined tile, and the like are stored. A slide operation program 312a, a pinch-in operation program 312b, a tap operation program 312c, and a long-tap operation program 312d are also stored in the program storage area as subroutines of the combined tile control program 312.

Programs for performing functions, such as the email function and the browser function, are also stored in the program storage area 302.

In the data storage area 304 of the RAM 46, a touch buffer 330, a selection buffer 332, a path buffer 334, an extraction buffer 336, and the like are provided, and a touch coordinate map 338, combined tile data 340, address book data 342, and the like are stored. A touch flag 344 and the like are also provided in the data storage area 304.

Data on touch coordinates output from the touch panel control circuit 48 (FIG. 2), data on touch coordinates of the start point and the end point of the touch operation, and the like are temporarily stored in the touch buffer 330. Information on tiles selected through the multi-touch operation is temporarily stored in the selection buffer 332. Data on touch coordinates indicating the path of the slide operation is temporarily stored in the path buffer 334. Information on component tiles extracted (selected) through the multi-touch operation is temporarily stored in the extraction buffer 336.

The touch coordinate map 338 is data for associating touch coordinates determined through the touch operation with display coordinates on the display 14 (FIG. 1). This means that results of the touch operation performed on the touch panel 16 (FIG. 1) are reflected in display on the display 14 based on the touch coordinate map 338. The combined tile data 340 is data including coordinates of display positions of component tiles constituting a combined tile and the like. The address book data is data including pieces of address data including phone numbers and email addresses. Contents of the address book data can be viewed and edited by performing the address book function.

The touch flag 344 is a flag for determining whether the touch panel 16 is touched. The touch flag 344 is configured by a one-bit register, for example. When the touch flag 344 is turned on (flagged), a data value "1" is set to the register. On the other hand, when the touch flag 344 is turned off (not flagged), a data value "0" is set to the register. The touch flag 344 is turned on and off based on output of the touch panel control circuit 48.

In the data storage area 304, output of the attitude sensor 50 (FIG. 2) may temporarily be stored, and another flag or timer (counter) required to execute a program may be provided.

Figure 13:
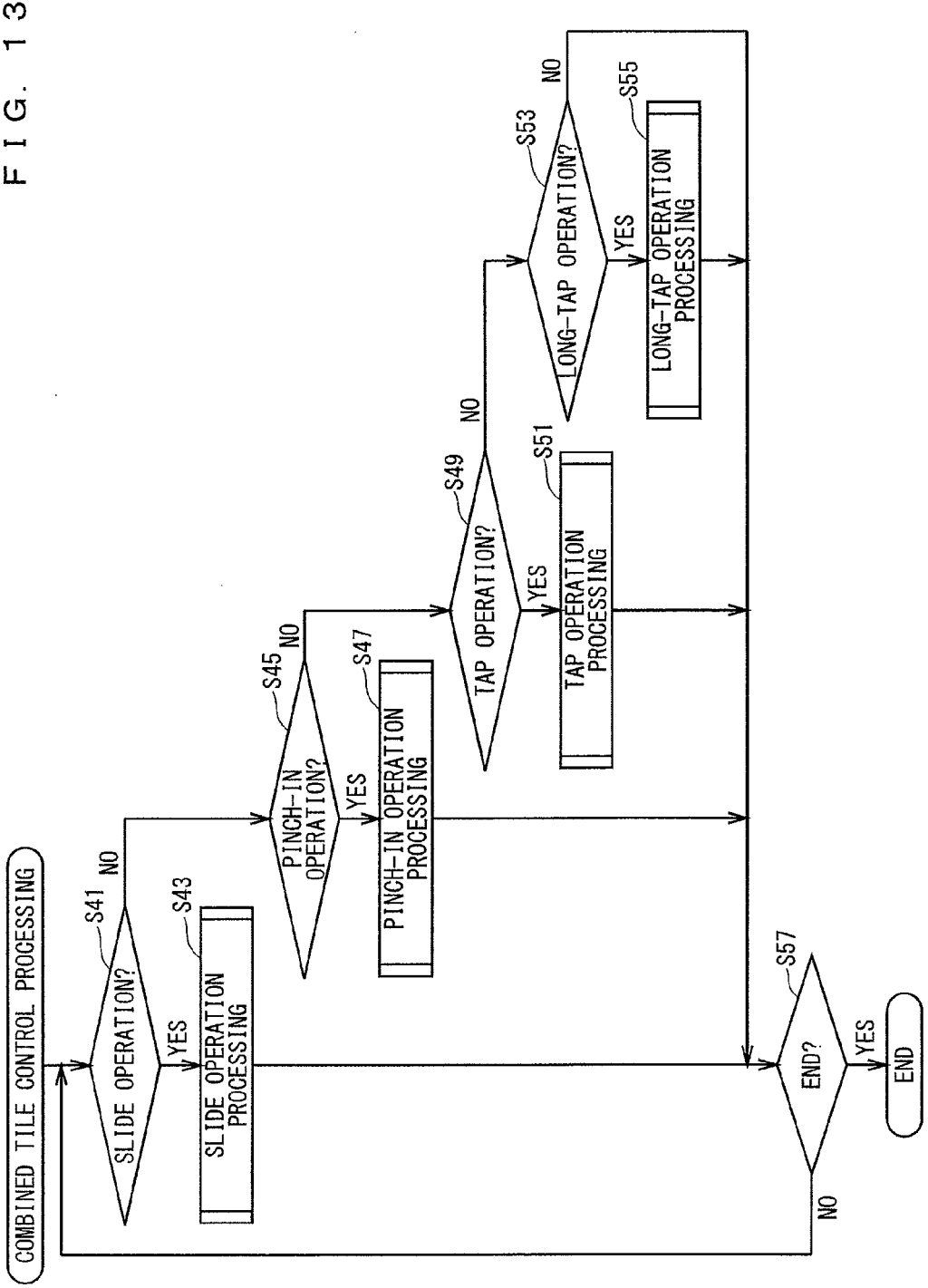
FIG. 13 illustrates a flow chart showing an example of combined tile control processing performed by the processor.
Figure 14:
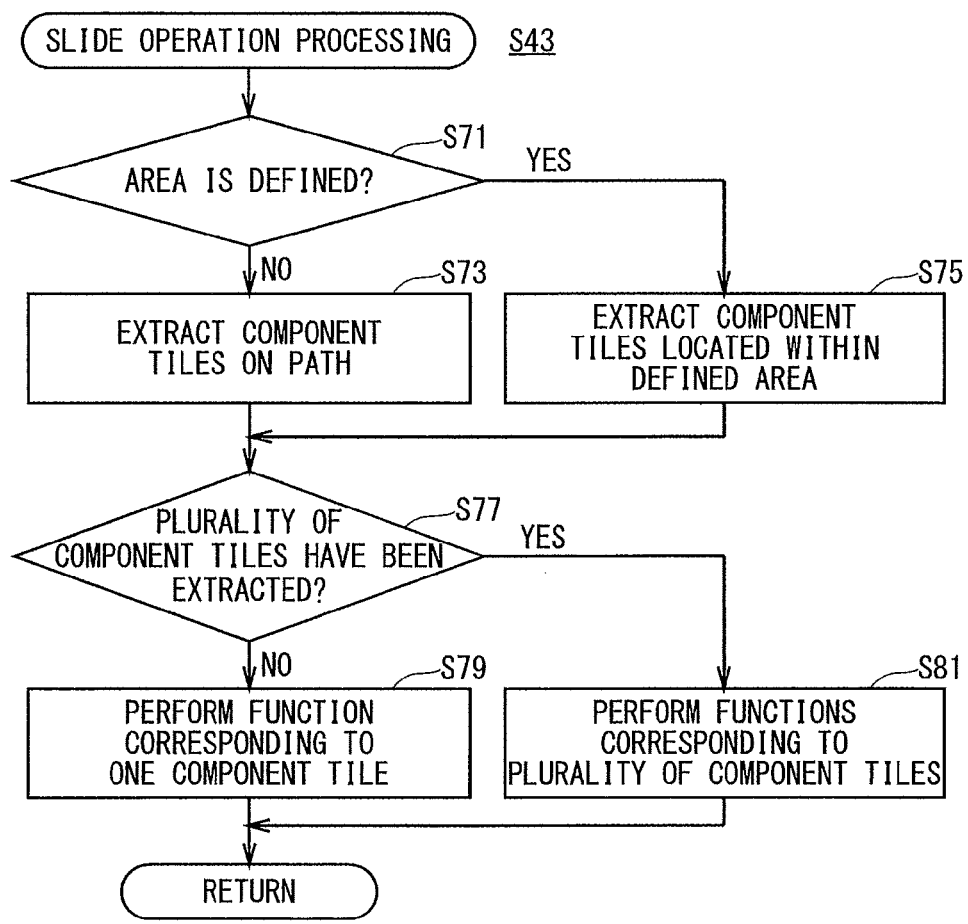
FIG. 14 illustrates a flow chart showing an example of slide operation processing performed by the processor.
Figure 16:
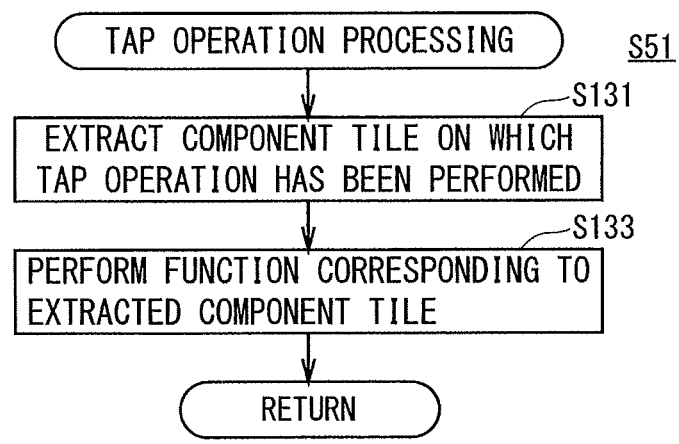
FIG. 16 illustrates a flow chart showing an example of tap operation processing performed by the processor.

The processor 30 (FIG. 2) processes a plurality of tasks, including tile combination processing illustrated in FIG. 12, combined tile control processing illustrated in FIG. 13, slide operation processing illustrated in FIG. 14, pinch-in operation processing illustrated in FIG. 15, tap operation processing illustrated in FIG. 16, and long-tap operation processing illustrated in FIG. 17, in parallel under control of an OS, such as a Windows®-based OS and a Linux®-based OS including Android® and iOS®.

FIG. 12 illustrates the flow chart of the tile combination processing performed by the processor 30. The tile combination processing starts when the home screen is displayed, for example. The processor 30 determines whether the multi-touch operation has been performed in step S1. This means that the processor 30 determines whether coordinates of two touch positions are stored in the touch buffer 330 with the touch flag 344 being on. If "NO" in step S1, i.e., the multi-touch operation has not been performed, the processor 30 determines whether the processing ends in step S3. It is determined whether an operation to remove display of the home screen has been performed. If "YES" in step S3, e.g., an operation to transition from the home screen to another screen has been performed, the processor 30 ends the tile combination processing. On the other hand, if "NO" in step S3, i.e., the home screen is displayed, the processor 30 returns to processing in step S1.

If "YES" in step S1, i.e., the multi-touch operation has been performed, the processor 30 defines a rectangle based on the two touch positions in step S5. For example, the rectangle is defined based on the two touch positions as illustrated in FIG. 4A.

Next, the processor 30 determines whether one or more tiles are located within the defined rectangle in step S7. If "NO" in step S7, i.e., no tile is located within the rectangle, the processor 30 returns to processing in step S1. On the other hand, if "YES" in step S7, i.e., the tiles are located within the defined rectangle, the processor 30 proceeds to processing in step S9.

The processor 30 determines whether a combined tile is located within the defined rectangle in step S9. If "NO" in step S9, i.e., no combined tile is located within the rectangle, the processor 30 selects the tiles located within the defined rectangle in step S11. For example, when the SNS tile, the phone tile, and the email tile are located within the rectangle as illustrated in FIG. 4A, information on these tiles is stored in the selection buffer 332. Next, the processor 30 determines whether the number of selected tiles is one in step S13. This means that it is determined whether the number of tiles located within the rectangle is one. If "YES" in step S13, i.e., the number of selected tiles is one, the processor 30 provides an error message in step S15, and returns to processing in step S1. For example, a character string "tile cannot be combined" is displayed on the display 14. If "NO" in step S13, i.e., a plurality of tiles are selected, the processor 30 proceeds to processing in step S19. The processor 30 functions as an error notifier when performing processing in step S15.

If "YES" in step S9, i.e., the combined tile is located within the defined rectangle, the processor 30 selects the combined tile and one or more tiles located within the defined rectangle in step S17. For example, the combined tile and the browser tile are selected as illustrated in FIG. 5A. When processing in step S17 ends, the processor 30 proceeds to processing in step S19.

The processor 30 functions as a selector when performing processing in step S11 or S17. In particular, the processor 30 functions as an addition selector when performing processing in step S17.

Next, the processor 30 determines whether the determination operation has been performed in step S19. For example, it is determined whether the pinch-in operation has been performed. The processor 30 determines that the pinch-in operation has been performed in step S19 when a movement distance of each of the two touch positions is greater than a threshold. The processor 30 functions as a determiner when performing processing in step S19.

If "NO" in step S19, e.g., the two touch positions have not changed, the processor 30 determines whether release has been performed in step S21. This means that it is determined whether the touch flag 344 has been turned off. If "YES" in step S21, e.g., the user releases fingers with which the multi-touch operation has been performed from the touch panel 16, the processor 30 returns to processing in step S1. On the other hand, if "NO" in step S21, i.e., the user continues the multi-touch operation, the processor 30 returns to processing in step S19.

If "YES" in step S19, e.g., the pinch-in operation has been performed, the processor 30 combines the selected tiles together in step S23. For example, when the tiles are selected as illustrated in FIG. 4A, the SNS tile, the phone tile, and the email tile are combined together. When the combined tile and the browser tile are selected as illustrated in FIG. 5A, the combined tile and the browser tile are combined together. When processing in step S23 ends, the processor 30 returns to processing in step S1. The processor 30 functions as a combination unit when performing processing in step S23.

FIG. 13 illustrates the flow chart of the combined tile control processing performed by the processor 30. The combined tile control processing starts when the home screen including the combined tile is displayed. The processor 30 determines whether the slide operation has been performed in step S41. This means that it is determined whether the slide operation has been performed on the combined tile. If "YES" in step S41, i.e., the slide operation has been performed on the combined tile, the processor 30 performs the slide operation processing in step S43. When processing in step S43 ends, the processor 30 proceeds to processing in step S57. Description on the slide operation processing in step S43 is herein omitted as the slide operation processing is described in detail with use of the flow chart of FIG. 14.

If "NO" in step S41, the processor 30 determines whether the pinch-in operation has been performed in step S45. This means that it is determined whether the pinch-in operation has been performed on the combined tile. If "YES" in step S45, i.e., the pinch-in operation has been performed on the combined tile, the processor 30 performs the pinch-in operation processing in step S47. When processing in step S47 ends, the processor 30 proceeds to processing in step S57. Description on the pinch-in operation processing in step S47 is herein omitted as the pinch-in operation processing is described in detail with use of the flow chart of FIG. 15.

If "NO" in step S45, i.e., the pinch-in operation has not been performed on the combined tile, the processor 30 determines whether the tap operation has been performed in step S49. This means that it is determined whether the tap operation has been performed on the combined tile. If "YES" in step S49, i.e., the tap operation has been performed on the combined tile, the processor 30 performs the tap operation processing in step S51. When processing in step S51 ends, the processor 30 proceeds to processing in step S57. Description on the tap operation processing in step S51 is herein omitted as the tap operation processing is described in detail with use of the flow chart of FIG. 16.

If "NO" in step S49, i.e., the tap operation has not been performed on the combined tile, the processor 30 determines whether the long-tap operation has been performed in step S53. This means that it is determined whether the long-tap operation has been performed on the combined tile. If "NO" in step S53, i.e., the long-tap operation has not been performed on the combined tile, the processor 30 proceeds to processing in step S57.

If "YES" in step S53, i.e., the long-tap operation has been performed on the combined tile, the processor 30 performs the long-tap operation processing in step S55. When processing in step S55 ends, the processor 30 proceeds to processing in step S57. Detailed description on the long-tap operation processing in step S55 is herein omitted as the long-tap operation processing is described in detail with use of the flow chart of FIG. 17.

The processor 30 determines whether the processing ends in step S57. For example, it is determined whether an operation to end display of the home screen has been performed. If "NO" in step S57, i.e., the home screen remains displayed, the processor 30 returns to processing in step S41. If "YES" in step S57, e.g., the operation to transition from the home screen to the other screen has been performed, the processor 30 ends the combined tile control processing.

The processor 30 functions as a detector when performing processing in step S41, S45, or S49. In particular, the processor 30 functions as a slide detector when performing processing in step S41, functions as a pinch-in detector when performing processing in step S45, and functions as a tap detector when performing processing in step S49.

FIG. 14 illustrates the flow chart of the slide operation processing performed by the processor 30. When processing in step S43 is performed in the combined tile control processing illustrated in FIG. 13, the processor 30 determines whether an area is defined in step S71. This means that it is determined whether the path of the slide operation forms a cross or the start point and the end point of the slide operation match each other. Specifically, it is determined whether the path of the slide operation forms a cross or the start point and the end point of the slide operation match each other based on the data on the coordinates indicating the path of the slide operation stored in the path buffer 334. If "NO" in step S71, e.g., the area is not defined by the path of the slide operation as illustrated in FIGS. 7A and 7B, the processor 30 extracts one or more component tiles on the path in step S73. For example, when the slide operation has been performed as illustrated in FIG. 7A, information on the SNS tile and the phone tile is stored in the extraction buffer 336. When processing in step S73 ends, the processor 30 proceeds to processing in step S77.

If "YES" in step S71, e.g., the start point and the end point of the slide operation match each other to define the area as illustrated in FIG. 8, the processor 30 extracts one or more component tiles located within the defined area in step S75. For example, when the area illustrated in FIG. 8 is defined, information on the SNS tile, the phone tile, and the email tile is stored in the extraction buffer 336. When processing in step S75 ends, the processor 30 proceeds to processing in step S77.

Next, the processor 30 determines whether a plurality of component tiles have been extracted in step S77. This means that it is determined whether the number of component tiles stored in the extraction buffer 336 is two or more. If "NO" in step S77, i.e., the number of extracted (selected) component tiles is one, the processor 30 performs a function corresponding to the one component tile in step S79. For example, when the extracted (selected) component tile is only the SNS tile, the SNS function corresponding to the SNS tile is performed in step S79. When processing in step S79 ends, the processor 30 ends the slide operation processing, and returns to the combined tile control processing.

If "YES" in step S77, i.e., the plurality of component tiles have been extracted (selected), the processor 30 performs functions corresponding to the plurality of component tiles in step S81. For example, when the SNS tile and the phone tile are selected as illustrated in FIG. 7A, the SNS function and the phone function respectively corresponding to the SNS tile and the phone tile are performed. When processing in step S81 ends, the processor 30 ends the slide operation processing, and returns to the combined tile control processing.

FIG. 15 illustrates the flow chart of the pinch-in operation processing performed by the processor 30. When processing in step S47 is performed in the combined tile control processing illustrated in FIG. 13, the processor 30 defines a rectangle based on two touch positions in step S101. For example, the rectangle is defined based on the first touch position Tp1 and the second touch position Tp2 as illustrated in FIGS. 5A and 9.

Next, the processor 30 determines whether one or more tiles that are not combined are located within the rectangle in step S103. For example, it is determined whether one or more tiles other than the component tiles are located within the defined rectangle. If "YES" in step S103, e.g., the browser tile that is not combined is located within the rectangle as illustrated in FIG. 5A, the processor 30 ends the pinch-in operation processing, and returns to the combined tile control processing.

If "NO" in step S103, i.e., one or more tiles located within the defined rectangle are all the component tiles, the processor 30 extracts the component tiles located within the rectangle in step S105. This means that information on the component tiles located within the defined rectangle is stored in the extraction buffer 336.

Next, the processor 30 determines whether a plurality of component tiles have been extracted in step S107 as in step S77. If "NO" in step S107, i.e., the number of extracted (selected) component tiles is one, the processor 30 performs a function corresponding to the one component tile in step S109 as in step S79. When processing in step S109 ends, the processor 30 ends the pinch-in operation processing, and returns to the combined tile control processing.

If "YES" in step S107, e.g., two component tiles are selected as illustrated in FIG. 9, the processor 30 performs functions corresponding to the plurality of component tiles in step S111 as in step S81. When processing in step S111 ends, the processor 30 ends the pinch-in operation processing, and returns to the combined tile control processing.

FIG. 16 illustrates the flow chart of the tap operation processing performed by the processor 30. When processing in step S51 is performed in the combined tile control processing illustrated in FIG. 13, the processor 33 extracts a component tile on which the tap operation has been performed in step S131. For example, when the tap operation has been performed as illustrated in FIG. 10, information on the email tile, which is one of the component tiles, is stored in the extraction buffer 336. Next, the processor 30 performs a function corresponding to the extracted component tile in step S133. For example, when the tap operation has been performed on the email tile as illustrated in FIG. 10, the email function is performed. When processing in step S133 ends, the processor 30 ends the tap operation processing, and returns to the combined tile control processing.

The processor 30 functions as a performance unit when performing processing in step S79, S81, S109, S111, or S133.

FIG. 17 illustrates the flow chart of the long-tap operation processing performed by the processor 30. When processing in step S55 is performed in the combined tile control processing illustrated in FIG. 13, the processor 33 displays the editing icon in step S151. For example, the release icon is displayed so as to overlap a folder as illustrated in FIG. 6B. A display manner of the combined tile changes upon display of the editing icon.

Next, the processor 30 determines whether an operation to change a display position has been performed in step S153. This means that it is determined whether the slide operation has been performed on the combined tile in the editable state. If "YES" in step S153, i.e., the slide operation has been performed on the combined tile in the editable state, the processor 30 moves the touched component tile as well as the other component tiles so that the other component tiles follow the touched component tile in step S155. For example, when the email tile of the three component tiles illustrated in FIG. 6B is touched, and then a downward slide operation is performed on the email tile, a display position of the email tile is changed downwards, and display positions of the SNS tile and the phone tile, which are not touched, are also changed downwards while shapes and a combined state thereof are retained. When processing in step S155 ends, the processor 30 proceeds to processing in step S161. The processor 30 functions as a movement unit when performing processing in step S155.

If "NO" in step S153, i.e., the operation to change the display position has not been performed, the processor 30 determines whether an operation to release combination of tiles combined together has been performed in step S157. This means that it is determined whether the tap operation has been performed on the release icon. If "YES" in step S157, i.e., the release operation has been performed, the processor 30 releases combination of the tiles combined together in step S159. For example, when the tap operation has been performed on the release icon illustrated in FIG. 6B, combination of the tiles combined together is released. When combination of the tiles combined together is released, information on the component tiles included in the combined tile data 340 is deleted. When processing in step S159 ends, the processor 30 ends the long-tap operation processing, and returns to the combined tile control processing. The processor 30 functions as a release unit when performing processing in step S159.

If "NO" in step S157, i.e., the release operation has not been performed, the processor 30 determines whether editing ends in step S161. This means that it is determined whether an operation to end editing of the combined tile has been performed. Specifically, it is determined whether the menu key 22c has been operated. If "NO" in step S161, i.e., the operation to end editing has not been performed, the processor 30 returns to processing in step S151. If "YES" in step S161, i.e., the operation to end editing has been performed, the processor 30 ends the long-tap operation processing, and returns to the combined tile control processing. In this case, information on the component tiles included in the combined tile data 340 is updated.

Second Embodiment

In one embodiment, tiles (hereinafter, referred to as address tiles or destination tiles) corresponding to pieces of address data included in the address book data are displayed in the home screen. For example, when the tap operation is performed on an address tile, details of a corresponding piece of address data as well as a GUI for making a call or creating an email are displayed. The address tiles can optionally be combined together as with the functional tiles in the first embodiment.

The mobile phone 10 according to the second embodiment is approximately the same as that in the first embodiment, and thus description on the appearance, the electrical configuration, and the like is omitted.

Figure 18:
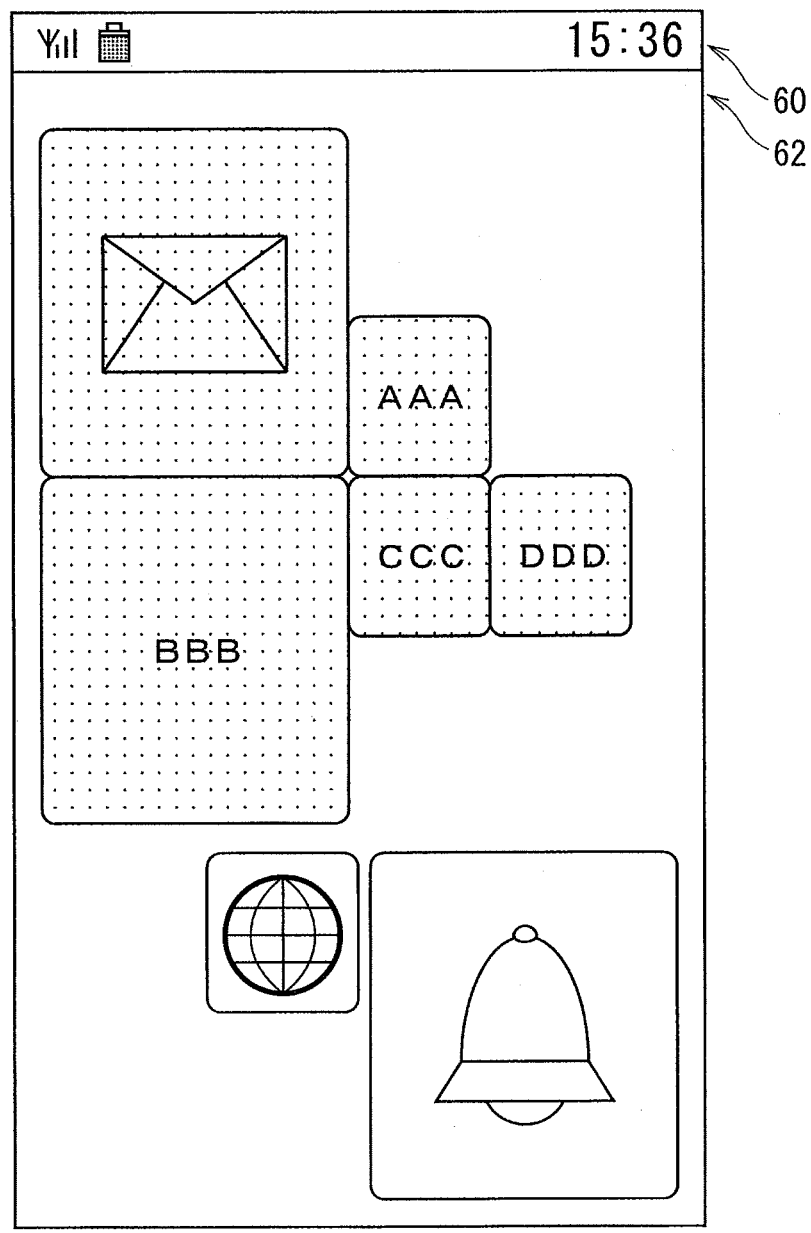
FIG. 18 illustrates an example of the state of displaying an email tile and address tiles on the display.

FIG. 18 illustrates an example of the state of displaying the email tile and address tiles on the display (FIG. 1). As illustrated in FIG. 18, in addition to the email tile, the browser tile, and the alarm tile, address tiles corresponding to pieces of address data "AAA", "BBB", and "CCC" are displayed in the home screen, for example. The email tile and the three address tiles are combined together.

In one embodiment, when the email tile and one or more of the address tiles are selected in a state in which the email tile and the address tiles are combined together, a new email is created. Email addresses included in pieces of address data corresponding to the address tiles are set to destinations of the new email.

Figure 19B:
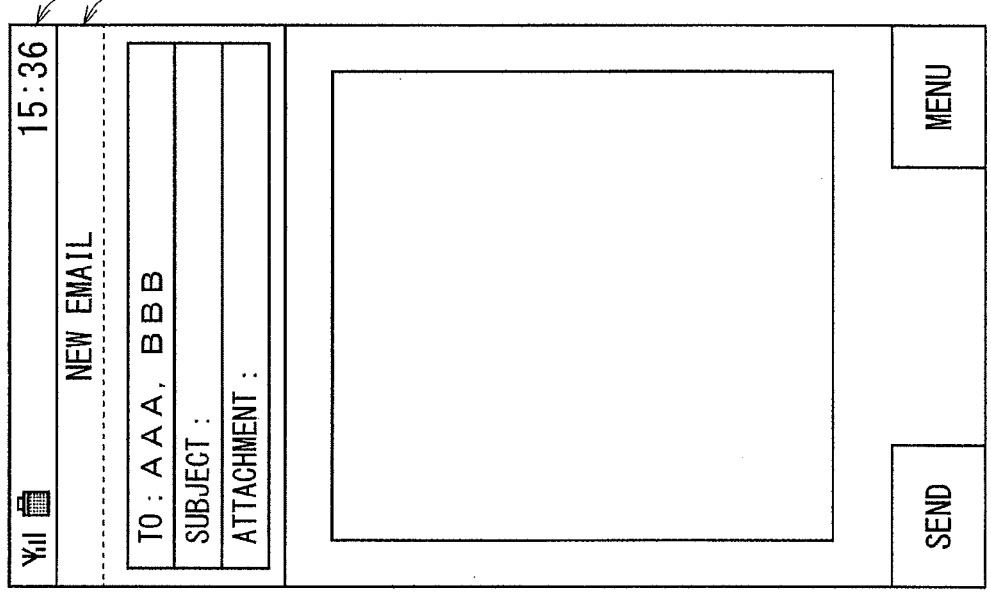
FIGS. 19A and 19B illustrate an example of a touch operation to select the email tile and address tiles of a combined tile.
Figure 19A:
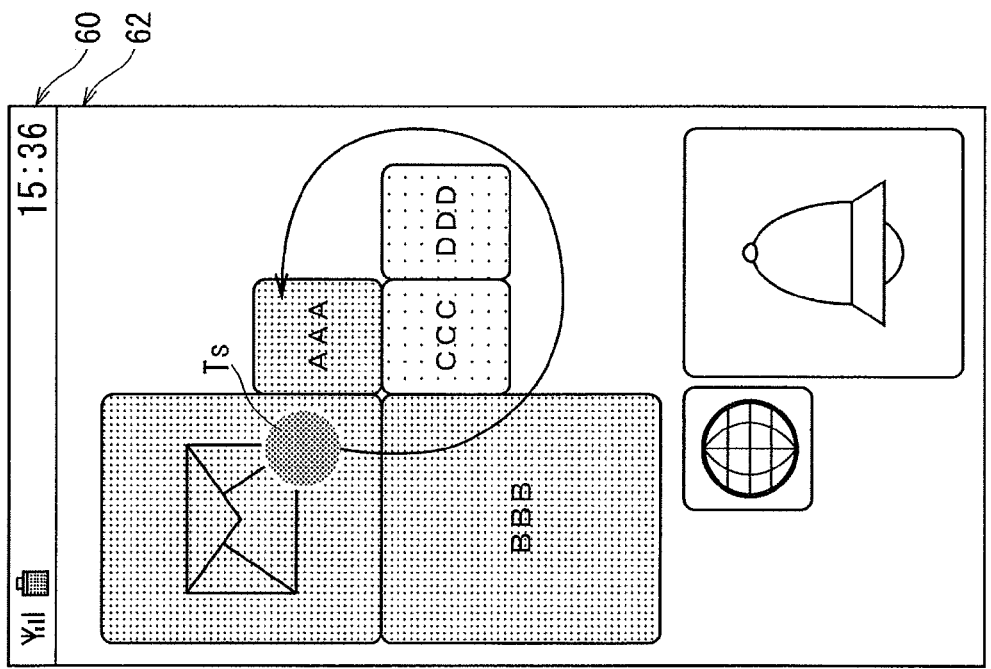

FIGS. 19A and 19B illustrate an example of a touch operation to select the email tile and address tiles of the combined tile illustrated in FIG. 18. FIG. 19A illustrates an example of the touch operation to select the email tile and the address tiles, and FIG. 19B illustrates an example of a new email whose destinations are set based on the address tiles selected through the touch operation illustrated in FIG. 19A.

When the email tile and the address tiles "AAA" and "BBB" are selected through a slide operation Ts as illustrated in FIG. 19A, a new email whose destinations are set to email addresses "AAA" and "BBB" is created as illustrated in FIG. 19B.

Figure 20B:
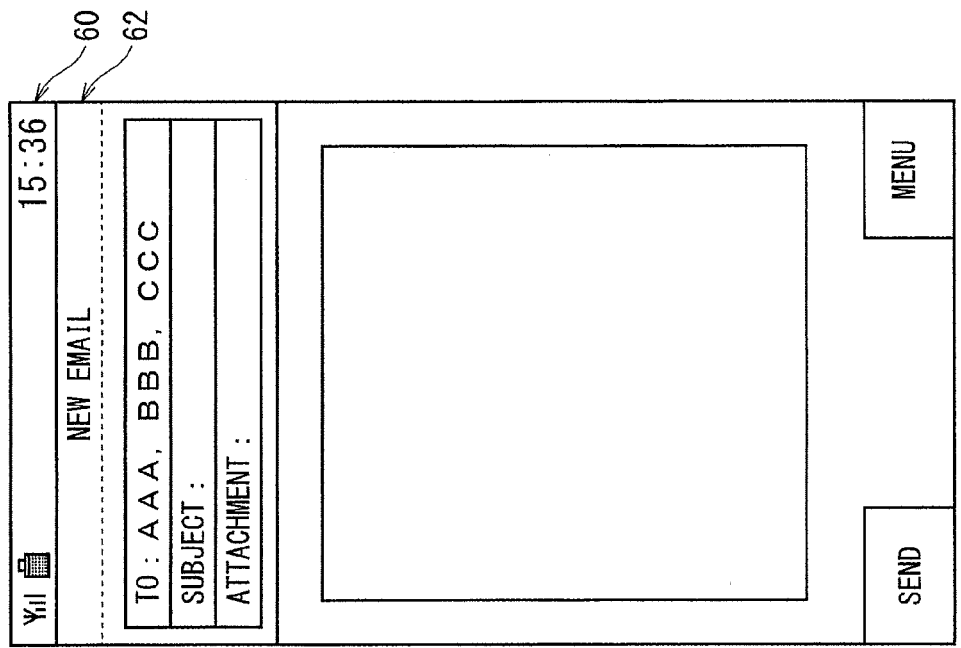
FIGS. 20A and 20B illustrate another example of the touch operation to select the email tile and address tiles of the combined tile.
Figure 20A:
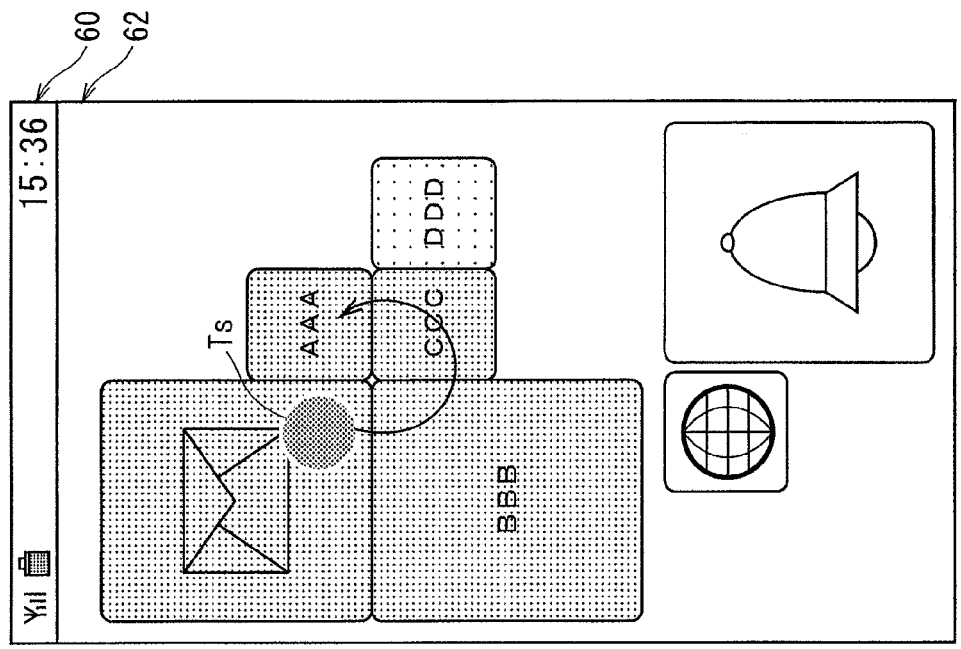

FIGS. 20A and 20B illustrate another example of the touch operation to select the email tile and address tiles of the combined tile illustrated in FIG. 18. FIG. 20A illustrates another example of the touch operation to select the email tile and any address tiles, and FIG. 20B illustrates an example of a new email whose destinations are set based on the address tiles selected through the touch operation illustrated in FIG. 20A.

When the email tile and the address tiles "AAA", "BBB", and "CCC" are selected through the slide operation Ts as illustrated in FIG. 20A, a new email whose destinations are set to three email addresses is created as illustrated in FIG. 20B.

As described above, when the email tile and the address tiles are combined together, the user can easily create a new email by selecting these tiles in an embodiment. In particular, the user can select any destinations of the new email by selecting any address tiles and the email tile.

The number of selected address tiles may be one. In this case, a new email whose destination is set to one destination based on the one address tile is created.

The email tile and the address tiles may be selected not through the slide operation but through the pinch-in operation.

The email function is also referred to as a message function. In other embodiments, the message function may include an SMS function, an MMS function, and an SNS function, such as LINE®, specific to transmission and reception of messages.

When the tap operation is performed on an address tile of the combined tile, details of a corresponding piece of address data as well as a GUI for making a call or creating an email are displayed as in a case where the tap operation is performed on a normal address tile.

The second embodiment is described in detail below with use of a flow chart of FIG. 21. FIG. 21 illustrates the flow chart of part of the slide operation processing in an embodiment. The slide operation processing in an embodiment uses processing in steps S71 to S81 illustrated in FIG. 14, but detailed description on the processing is omitted as the processing is approximately the same as that in the first embodiment.

When the slide operation processing in an embodiment is performed, the processor 30 performs processing in steps S71 to S75 illustrated in FIG. 14. When processing in step S73 or S75 ends, the processor 30 determines whether a message tile (message object) is included in step S181. For example, it is determined whether the email tile is included in the selected component tiles.

If "NO" in step S181, e.g., the email tile is not included, the processor 30 performs processing in and after step S77 illustrated in FIG. 14.

If "YES" in step S181, e.g., the email tile is selected, the processor 30 determines whether one or more destination tiles (destination objects) are included in step S183. For example, it is determined whether one or more address tiles are included in the selected component tiles.

If "NO" in step S183, e.g., no address tile is selected, the processor 30 performs processing in and after step S77.

If "YES" in step S183, e.g., the email tile and the address tiles are selected, the processor 30 creates a new message in step S185. For example, when the email tile is selected, a new email is created.

Next, the processor 30 determines whether a plurality of destination tiles have been extracted in step S187. For example, it is determined whether a plurality of address tiles are stored in the extraction buffer 336.

If "NO" in step S187, e.g., the number of extracted (selected) address tiles is one, the processor 30 sets a destination based on the one destination tile in step S189. For example, an email address is read from a piece of address data corresponding to the selected address tile, and the email address is set to the destination of a new email. When processing in step S189 ends, the processor 30 ends the slide operation processing, and returns to the combined tile control processing.

If "YES" in step S187, e.g., a plurality of address tiles have been selected, the processor 30 sets a plurality of destinations based on the plurality of destination tiles in step S191. For example, when two address tiles have been selected as illustrated in FIG. 19A, email addresses are read from pieces of address data corresponding to the address tiles "AAA" and "BBB", and the two read email addresses are set to the destinations of a new email. When processing in step S191 ends, the processor 30 ends the slide operation processing, and returns to the combined tile control processing. The processor 30 functions as a creator when performing processing in step S185, S189, or S191.

Processing equivalent to processing in steps S181 to S191 in the slide operation processing is performed between steps S105 and S107 in the pinch-in operation processing illustrated in FIG. 15.

The first embodiment and the second embodiment can be combined with each other. Detailed description on the combination is herein omitted as the combination can easily be conceived.

Although the rectangle defined through the pinch-in operation, the path of the slide operation, and the like are illustrated in the first embodiment and the second embodiment, the rectangle and the path may not actually be displayed or may be displayed to allow the user to easily know these operations.

A figure defined through the pinch-in operation is not limited to a rectangle, and may be a circle whose diameter is a line connecting two touch positions.

A tile corresponding to another application (e.g., an SMS) may further be included in the home screen.

In one embodiment described above, a term "greater than" the threshold is used, but the state of being "greater than the threshold" includes the state of being "equal to or greater than the threshold". The state of being "smaller than the threshold" includes the state of being "equal to or smaller than the threshold" and the state of being "below the threshold".

The programs used in one embodiment may be stored in an HDD of a server for data distribution, and may be distributed to the mobile phone 10 through a network. A recording medium, such as an optical disk including CD, DVD, and Blue-ray Disk (BD), USB memory, and a memory card, storing a plurality of programs may be sold or distributed. When programs downloaded through the above-mentioned server, recording medium, and the like are installed on a mobile phone having equivalent configuration to that in one embodiment, equivalent effects to those obtained in one embodiment can be obtained.

Specific numerical values appearing in the present specification are mere examples, and can appropriately be changed in accordance with the change of specifications of products and the like.

While the present disclosure has been described in detail, the foregoing description is in all aspects illustrative and not restrictive. Numerous modifications not having been described can be devised without departing from the scope of the present disclosure.

The invention claimed is:

1. A mobile terminal comprising:
    a display device on which a plurality of tiled objects for performing functions are displayed in particular shapes;
    a touch panel disposed on the display device;
    a selector that selects, when two positions are touched on the touch panel, one or more of the tiled objects based on the positions of the touch; and
    a combination unit that combines, when the selector selects two or more of the tiled objects, the two or more tiled objects together while retaining shapes of the two or more tiled objects, wherein the two or more tiled objects do not overlap with each other;
    wherein the combination unit combines the selected two or more tiled objects together by moving the selected two or more tiled objects toward each other such that space between the selected two or more tiled objects are minimized.

2. The mobile terminal according to claim 1 further comprising:
    a determiner that determines whether a determination operation to determine selection of the two or more tiled objects selected by the selector has been performed, wherein
    the combination unit combines the two or more tiled objects together while retaining the shapes of the two or more tiled objects when the determiner determines that the determination operation has been performed.

3. The mobile terminal according to claim 2, wherein the selector includes:
    an addition selector that selects, when two positions are touched on the touch panel, two or more of the tiled objects that are combined together and one or more of the tiled objects that are not combined based on the positions of the touch, and
    the combination unit combines the two or more tiled objects that are combined together and the one or more tiled objects selected by the addition selector together while retaining shapes of the two or more tiled objects that are combined together and the one or more tiled objects selected by the addition selector.

4. The mobile terminal according to claim 3, wherein the determiner determines whether a determination operation to determine selection of the two or more tiled objects that are combined together and the one or more tiled objects that are not combined has been performed, and the combination unit combines the two or more tiled objects that are combined together and the one or more tiled objects selected by the addition selector together while retaining the shapes of the two or more tiled objects that are combined together and the one or more tiled objects selected by the addition selector when the determiner determines that the determination operation has been performed.

5. The mobile terminal according to claim 1 further comprising:
a movement unit that moves, when an operation to move the two or more tiled objects combined together by the combination unit has been performed, the two or more tiled objects combined together while retaining the shapes of the two or more tiled objects combined together.

6. The mobile terminal according to claim 1 further comprising:
a release unit that releases combination of the two or more tiled objects combined together by the combination unit.

7. The mobile terminal according to claim 1 further comprising:
an error notifier that provides an error notification when the number of tiled objects selected by the selector is one.

8. The mobile terminal according to claim 1 further comprising:
a detector that detects selection of one or more of component objects that are the two or more tiled objects combined together by the combination unit; and
a processor that performs, when the detector detects selection of the one or more component objects, one or more functions corresponding to the one or more component objects.

9. The mobile terminal according to claim 8, wherein when the detector detects selection of a plurality of component objects, the processor performs functions corresponding to the plurality of component objects.

10. The mobile terminal according to claim 8, wherein the detector includes:
a slide detector that detects selection of the one or more component objects through a slide operation, and
when selection of the one or more component objects is detected through the slide operation, the processor performs the one or more functions corresponding to the one or more component objects.

11. The mobile terminal according to claim 10, wherein the slide detector detects a slide operation to define an area, and
the processor performs the one or more functions corresponding to the one or more components objects located within the defined area.

12. The mobile terminal according to claim 8, wherein the detector includes:
a pinch-in detector that detects selection of the one or more component objects through a pinch-in operation, and
when selection of the one or more component objects is detected through the pinch-in operation, the processor performs the one or more functions corresponding to the one or more component objects.

13. The mobile terminal according to claim 8, wherein the detector includes:
a tap detector that detects selection of the one or more component objects through a tap operation, and
when selection of the one or more component objects is detected through the tap operation, the processor performs the one or more functions corresponding to the one or more component objects.

14. The mobile terminal according to claim 1, wherein one or more destination objects corresponding to one or more pieces of destination information are further displayed on the display device,
the tiled objects include a message object corresponding to a message function, and
the mobile terminal further comprises
a creator that creates, when selection of the message object and one or more of the one or more destination objects is detected in a state in which the message object and the one or more destination objects are combined together, a message whose destinations are set based on one or more pieces of destination information corresponding to the one or more selected destination objects.

15. The mobile terminal according to claim 14, wherein when selection of the message object and two or more of a plurality of destination objects is detected in a state in which the message object and the plurality of destination objects are combined together, the creator creates a message whose destinations are set based on pieces of destination information corresponding to the two or more destination objects.

16. A non-transitory computer readable storage medium that stores a combination control program that causes a processor of a mobile terminal including a display device on which a plurality of tiled objects for performing functions are displayed in particular shapes and a touch panel disposed on the display device to function as:
a selector that selects, when two positions are touched on the touch panel, one or more of the tiled objects corresponding to an area including the two positions of the touch; and
a combination unit that combines, when the selector selects two or more of the tiled objects, the two or more tiled objects together while retaining shapes of the two or more tiled objects, wherein the two or more tiled objects do not overlap with each other;
wherein the combination unit combines the selected two or more tiled objects together by moving the selected two or more tiled objects toward each other such that space between the selected two or more tiled objects are minimized; and
wherein the selector sets the area based on the two positions of the touch, and selects the two or more tiled objects when the two or more tiled objects are located within the area.

17. A combination control method for use in a mobile terminal including a display device on which a plurality of tiled objects for performing functions are displayed in particular shapes and a touch panel disposed on the display device, wherein
A processor of the mobile terminal performs the steps of:
selecting, when two positions are touched on the touch panel, one or more of the tiled objects based on the positions of the touch; and
combining, when two or more of the tiled objects are selected in the selection step, the two or more tiled objects together while retaining shapes of the two or more tiled objects, wherein the two or more tiled objects do not overlap with each other;
wherein combining the selected two or more tiled objects together comprises moving the selected two or more tiled objects toward each other such that space between the selected two or more tiled objects are minimized.

* * * * *